(12) United States Patent
Hunter et al.

(10) Patent No.: US 6,850,901 B1
(45) Date of Patent: Feb. 1, 2005

(54) SYSTEM AND METHOD PERMITTING CUSTOMERS TO ORDER PRODUCTS FROM MULTIPLE PARTICIPATING MERCHANTS

(75) Inventors: Charles Eric Hunter, Hilton Head Island, SC (US); Bernard L. Ballou, Jr., Raleigh, NC (US); Robert D. Summer, New Preston, CT (US); Kelly C. Sparks, Raleigh, NC (US); Ollin B. Sykes, Edenton, NC (US); John H. Hebrank, Durham, NC (US)

(73) Assignee: World Theatre, Inc., Morrisville, NC (US)

( * ) Notice: Subject to any disclaimer, the term of this patent is extended or adjusted under 35 U.S.C. 154(b) by 0 days.

(21) Appl. No.: 09/645,086

(22) Filed: Aug. 24, 2000

Related U.S. Application Data

(63) Continuation-in-part of application No. 09/567,716, filed on May 10, 2000, and a continuation-in-part of application No. 09/564,386, filed on May 3, 2000, and a continuation-in-part of application No. 09/465,729, filed on Dec. 17, 1999.

(51) Int. Cl.[7] .............................. G06F 17/60; G06F 9/44
(52) U.S. Cl. ......................... 705/26; 705/27; 711/202; 711/212; 717/101; 717/106
(58) Field of Search ..................... 705/26, 27; 717/106, 717/101; 711/202, 212; G06F 17/60, 9/44

(56) References Cited

U.S. PATENT DOCUMENTS

| | | |
|---|---|---|
| 3,373,517 A | 3/1968 | Halperin |
| 3,376,465 A | 4/1968 | Corpew |
| 3,848,193 A | 11/1974 | Martin et al. .................. 325/53 |
| 3,941,926 A | 3/1976 | Slobodzian et al. ......... 178/7.3 |
| 3,983,317 A | 9/1976 | Glorioso ..................... 178/6.6 |
| 3,993,955 A | 11/1976 | Belcher et al. ............. 325/308 |

(List continued on next page.)

FOREIGN PATENT DOCUMENTS

| | | | |
|---|---|---|---|
| EP | 0 683 943 B1 | 11/1993 | ............ H04H/1/00 |
| EP | 0 954 176 A2 | 11/1999 | ............ H04N/7/16 |
| EP | 0 954 179 A2 | 11/1999 | .......... H04N/7/173 |

(List continued on next page.)

OTHER PUBLICATIONS

US 5,825,354, 10/1998, Ahmad et al. (withdrawn)
The Internet archive Wayback Machine of http://www.egghead.com/, and http://www.onsale.com for evidences before claimed priority date.*
See the Continuation Sheet.*
From http://www.eBay.com. eBay.com practices of merchandising product & contacts between sellers and buyers.
From http://www.amazon.com, amazon.com, Inc. practices of merchandising products & contacts between sellers and buyers.

(List continued on next page.)

*Primary Examiner*—Cuong Nguyen
(74) *Attorney, Agent, or Firm*—Lava Group Law by Smith & Frohwein; Gregory Scott Smith

(57) ABSTRACT

A universal automated order processing system represents multiple (e.g., hundreds or thousands) participating merchants who offer their products through the system. Customers become qualified for using the system by supplying a set of information (e.g., name, credit card number, shipping address) that is stored in a customer database. When a customer wishes to order a product, the customer calls the system, customer identity is automatically confirmed, the customer enters a product order number and the complete order is routed to the appropriate merchant with the information necessary for the merchant to fulfill the order. Available credit verification and other aspects of credit card transactions may be handled by either the system operator or the merchant. The system operator may offer revolving credit. The system may also be used to provide potential customers of the merchants with free product information.

49 Claims, 17 Drawing Sheets

U.S. PATENT DOCUMENTS

| | | |
|---|---|---|
| 4,094,010 A | 6/1978 | Pepperl et al. .............. 365/215 |
| 4,155,042 A | 5/1979 | Permut et al. ................. 325/64 |
| 4,332,022 A | 5/1982 | Ceshkovsky et al. ......... 369/44 |
| 4,368,485 A | 1/1983 | Midland ...................... 358/64 |
| 4,476,488 A | 10/1984 | Merrell ....................... 358/86 |
| 4,536,791 A | 8/1985 | Campbell et al. ............ 358/122 |
| 4,559,480 A | 12/1985 | Nobs .......................... 315/324 |
| 4,575,750 A | 3/1986 | Callahan ..................... 358/86 |
| 4,595,950 A | 6/1986 | Lofberg ....................... 358/122 |
| 4,654,482 A | 3/1987 | DeAngelis ................... 379/95 |
| 4,716,410 A | 12/1987 | Nozaki ................. 340/825.52 |
| 4,734,779 A | 3/1988 | Levis et al. ................. 358/231 |
| 4,734,858 A | 3/1988 | Schlafly |
| 4,761,641 A | 8/1988 | Schreiber .................... 340/717 |
| 4,789,863 A | 12/1988 | Bush .................... 340/825.35 |
| 4,797,913 A | 1/1989 | Kaplan et al. ................. 379/91 |
| 4,809,325 A | 2/1989 | Hayashi et al. ............... 380/20 |
| 4,812,843 A | 3/1989 | Champion, III et al. .... 340/905 |
| 4,829,569 A | 5/1989 | Seth-Smith et al. .......... 380/10 |
| 4,847,825 A | 7/1989 | Levine ......................... 369/47 |
| 4,862,268 A | 8/1989 | Campbell et al. ............ 358/141 |
| 4,908,713 A | 3/1990 | Levine ........................ 358/335 |
| 4,949,187 A | 8/1990 | Cohen ........................ 358/335 |
| 5,046,090 A | 9/1991 | Walker et al. ................. 380/5 |
| 5,051,822 A | 9/1991 | Rhoades ...................... 358/86 |
| 5,073,925 A | 12/1991 | Nagata et al. ................. 380/3 |
| 5,107,107 A | 4/1992 | Osborne ............... 250/231.14 |
| 5,121,430 A | 6/1992 | Ganzer et al. ................ 380/48 |
| 5,123,046 A | 6/1992 | Levine ........................ 380/10 |
| 5,133,079 A | 7/1992 | Ballantyne et al. ........... 455/4.1 |
| 5,182,669 A | 1/1993 | Chikuma et al. ............ 359/241 |
| 5,191,573 A | 3/1993 | Hair ............................ 369/84 |
| 5,214,793 A | 5/1993 | Conway et al. ............. 455/49.1 |
| 5,233,423 A | 8/1993 | Jernigan et al. ............. 358/181 |
| 5,235,587 A | 8/1993 | Bearden et al. ............. 369/106 |
| 5,251,193 A | 10/1993 | Nelson et al. ............ 369/44.12 |
| 5,257,017 A | 10/1993 | Jones et al. .................. 345/13 |
| 5,260,778 A | 11/1993 | Kauffman et al. ............ 358/86 |
| 5,274,762 A | 12/1993 | Peterson et al. |
| 5,283,731 A | 2/1994 | Lalonde et al. |
| 5,297,204 A | 3/1994 | Levine ........................ 380/10 |
| 5,311,423 A | 5/1994 | Clark |
| 5,319,735 A | 6/1994 | Preuss et al. |
| 5,355,302 A | 10/1994 | Martin et al. |
| 5,365,282 A | 11/1994 | Levine ........................ 348/734 |
| 5,373,330 A | 12/1994 | Levine ........................ 348/734 |
| 5,414,756 A | 5/1995 | Levine ........................ 379/67 |
| 5,418,713 A | 5/1995 | Allen |
| 5,420,647 A | 5/1995 | Levine ........................ 348/734 |
| 5,420,923 A | 5/1995 | Beyers, II et al. ............ 380/20 |
| 5,428,606 A | 6/1995 | Moskowitz ................... 370/60 |
| 5,438,355 A | 8/1995 | Palmer .......................... 348/1 |
| 5,465,291 A | 11/1995 | Barrus et al. ................. 379/67 |
| 5,469,020 A | 11/1995 | Herrick ....................... 313/511 |
| 5,469,206 A | 11/1995 | Strubbe et al. ................. 348/7 |
| 5,473,584 A | 12/1995 | Oshima ....................... 369/32 |
| 5,486,819 A | 1/1996 | Horie .......................... 340/905 |
| 5,495,283 A | 2/1996 | Cowe ........................... 348/9 |
| 5,497,186 A | 3/1996 | Kawasaki ...................... 348/6 |
| 5,497,479 A | 3/1996 | Hornbuckle |
| 5,508,815 A | 4/1996 | Levine ....................... 358/335 |
| 5,512,935 A | 4/1996 | Majeti et al. ................... 348/9 |
| 5,513,260 A | 4/1996 | Ryan ............................ 380/3 |
| 5,530,751 A | 6/1996 | Morris .......................... 380/4 |
| 5,532,920 A | 7/1996 | Hartrick et al. |
| 5,543,856 A | 8/1996 | Rosser et al. ................ 348/578 |
| 5,557,541 A | 9/1996 | Schulhof et al. |
| 5,559,549 A | 9/1996 | Hendricks et al. ............. 348/6 |
| 5,565,909 A | 10/1996 | Thibadeau et al. ............. 348/9 |
| 5,568,272 A | 10/1996 | Levine ........................ 386/48 |
| 5,592,511 A | 1/1997 | Schoen et al. .............. 375/220 |
| 5,592,551 A | 1/1997 | Lett et al. ..................... 380/20 |
| 5,592,626 A | 1/1997 | Papadimitriou et al. |
| 5,600,839 A | 2/1997 | MacDonald |
| 5,610,653 A | 3/1997 | Abecassis ................... 348/110 |
| 5,612,741 A | 3/1997 | Loban et al. ................ 348/383 |
| 5,619,247 A | 4/1997 | Russo ........................... 348/3 |
| 5,621,840 A | 4/1997 | Kawamura et al. ........... 386/68 |
| 5,621,863 A | 4/1997 | Boulet et al. |
| 5,627,895 A | 5/1997 | Owaki ......................... 380/54 |
| 5,628,050 A | 5/1997 | McGraw et al. ........... 455/12.1 |
| 5,630,067 A | 5/1997 | Kindell et al. |
| 5,638,113 A | 6/1997 | Lappington et al. .......... 348/12 |
| 5,640,453 A | 6/1997 | Schuchman et al. .......... 380/10 |
| 5,644,859 A | 7/1997 | Hsu ............................. 40/545 |
| 5,646,603 A | 7/1997 | Nagata et al. ......... 340/825.25 |
| 5,646,997 A | 7/1997 | Barton ........................ 380/23 |
| 5,654,747 A | 8/1997 | Ottesen et al. ................ 348/12 |
| 5,659,366 A | 8/1997 | Kerman ...................... 348/460 |
| 5,659,613 A | 8/1997 | Copeland et al. .............. 380/3 |
| 5,661,516 A | 8/1997 | Carles .......................... 348/8 |
| 5,664,018 A | 9/1997 | Leighton ...................... 380/54 |
| 5,675,734 A | 10/1997 | Hair |
| 5,684,918 A | 11/1997 | Abecassis .................... 386/83 |
| 5,686,954 A | 11/1997 | Yoshinobu et al. ........... 348/13 |
| 5,689,799 A | 11/1997 | Dougherty et al. ............. 455/2 |
| 5,692,214 A | 11/1997 | Levine ....................... 395/833 |
| 5,701,161 A | 12/1997 | Williams et al. ............ 348/468 |
| 5,701,383 A | 12/1997 | Russo et al. .................. 386/46 |
| 5,701,397 A | 12/1997 | Steimle et al. |
| 5,710,869 A | 1/1998 | Godefray et al. ............. 395/21 |
| 5,717,814 A | 2/1998 | Abecassis .................... 386/46 |
| 5,717,832 A | 2/1998 | Steimle et al. |
| 5,721,827 A | 2/1998 | Logan et al. |
| 5,721,951 A | 2/1998 | DorEl |
| 5,724,062 A | 3/1998 | Hunter ....................... 345/102 |
| 5,724,091 A | 3/1998 | Freeman et al. .............. 348/13 |
| 5,724,525 A | 3/1998 | Beyers, II et al. |
| 5,729,214 A | 3/1998 | Moore ........................ 340/905 |
| 5,734,413 A | 3/1998 | Lappington et al. .......... 348/12 |
| 5,740,326 A | 4/1998 | Boulet et al. |
| 5,748,716 A | 5/1998 | Levine ................. 379/102.03 |
| 5,758,257 A | 5/1998 | Herz et al. ..................... 455/2 |
| 5,760,820 A | 6/1998 | Eda et al. ...................... 348/9 |
| 5,761,606 A | 6/1998 | Wolzien ..................... 455/6.2 |
| 5,781,734 A | 7/1998 | Ohno et al. |
| 5,790,202 A | 8/1998 | Kummer et al. ............. 348/553 |
| 5,790,937 A | 8/1998 | Gutle ......................... 455/6.3 |
| 5,799,285 A | 8/1998 | Klingman ..................... 705/26 |
| 5,805,154 A | 9/1998 | Brown ........................ 345/327 |
| 5,805,763 A | 9/1998 | Lawler et al. ................ 386/83 |
| 5,809,139 A | 9/1998 | Girod et al. .................. 380/5 |
| 5,818,806 A | 10/1998 | Wong et al. .................. 369/59 |
| 5,822,432 A | 10/1998 | Moskowitz et al. .......... 380/28 |
| 5,825,407 A | 10/1998 | Cowe et al. ................... 348/6 |
| 5,826,123 A | 10/1998 | Lai ............................ 396/446 |
| RE35,954 E | 11/1998 | Levine ........................ 380/10 |
| 5,832,287 A | 11/1998 | Atalla |
| 5,835,896 A | 11/1998 | Fisher et al. .................. 705/37 |
| 5,841,979 A | 11/1998 | Schulhof et al. |
| 5,845,083 A | 12/1998 | Hamadani et al. |
| 5,848,129 A | 12/1998 | Baker .......................... 379/67 |
| 5,848,155 A | 12/1998 | Cox .............................. 380/4 |
| 5,848,352 A | 12/1998 | Dougherty et al. .......... 455/5.1 |
| 5,854,779 A | 12/1998 | Johnson et al. .............. 369/59 |
| 5,857,020 A | 1/1999 | Peterson, Jr. ................. 380/4 |
| 5,860,068 A | 1/1999 | Cook .......................... 705/26 |
| 5,870,717 A | 2/1999 | Wiecha ....................... 705/26 |
| 5,874,985 A | 2/1999 | Matthews, III ................ 348/7 |

| | | | |
|---|---|---|---|
| 5,889,868 A | 3/1999 | Moskowitz et al. ............ 380/51 |
| 5,890,136 A | 3/1999 | Kipp ............................. 705/22 |
| 5,897,622 A | 4/1999 | Blinn et al. .................... 705/26 |
| 5,898,384 A | 4/1999 | Alt et al. ................ 340/825.36 |
| 5,903,878 A | 5/1999 | Talati et al. ................... 705/26 |
| 5,905,800 A | 5/1999 | Moskowitz et al. ............ 380/28 |
| 5,909,492 A | 6/1999 | Payne et al. ................... 380/24 |
| 5,915,018 A | 6/1999 | Aucsmith ....................... 380/4 |
| 5,915,027 A | 6/1999 | Cox et al. ...................... 380/54 |
| 5,915,068 A | 6/1999 | Levine ........................... 386/83 |
| 5,918,213 A | 6/1999 | Bernard et al. ................ 705/26 |
| 5,930,369 A | 7/1999 | Cox et al. ...................... 380/54 |
| 5,933,798 A | 8/1999 | Linnartz ....................... 702/191 |
| 5,934,795 A | 8/1999 | Rykowski et al. ............ 362/309 |
| 5,940,135 A | 8/1999 | Petrovic et al. ............... 348/473 |
| 5,943,670 A | 8/1999 | Prager ............................ 707/5 |
| 5,946,665 A | 8/1999 | Suzuki et al. .................. 705/26 |
| 5,949,885 A | 9/1999 | Leighton ....................... 380/54 |
| 5,956,716 A | 9/1999 | Kenner et al. ................. 707/10 |
| 5,959,945 A | 9/1999 | Kleiman et al. ............... 369/30 |
| 5,960,081 A | 9/1999 | Vynne et al. .................. 380/10 |
| 5,960,411 A | 9/1999 | Hartman et al. ............... 705/26 |
| 5,963,264 A | 10/1999 | Jackson ....................... 348/460 |
| 5,963,915 A | 10/1999 | Kirsch ............................ 705/26 |
| 5,963,917 A | 10/1999 | Ogram ........................... 705/26 |
| 5,966,440 A | 10/1999 | Hair ............................... 380/4 |
| 5,966,697 A | 10/1999 | Fergerson et al. ............. 705/26 |
| 5,969,283 A | 10/1999 | Looney et al. ................. 84/609 |
| 5,969,715 A | 10/1999 | Dougherty et al. .......... 345/327 |
| 5,970,471 A | 10/1999 | Hill ................................ 705/26 |
| 5,970,472 A | 10/1999 | Allsop et al. .................. 705/26 |
| 5,970,473 A | 10/1999 | Gerszberg et al. ............ 705/26 |
| 5,970,474 A | 10/1999 | LeRoy et al. .................. 705/27 |
| 5,970,475 A | 10/1999 | Barnes et al. .................. 705/27 |
| 5,974,396 A | 10/1999 | Anderson et al. ............. 705/10 |
| 5,983,199 A | 11/1999 | Kaneko ......................... 705/26 |
| 5,983,200 A | 11/1999 | Slotznick ...................... 705/26 |
| 5,983,201 A | 11/1999 | Fay ................................ 705/27 |
| 5,988,078 A | 11/1999 | Levine ........................... 110/8 |
| 5,992,888 A | 11/1999 | North et al. ................... 283/56 |
| 6,002,772 A | 12/1999 | Saito .............................. 380/49 |
| 6,005,602 A | 12/1999 | Matthews, III ................ 348/7 |
| 6,006,332 A | 12/1999 | Rabne et al. .................. 713/201 |
| 6,013,007 A | 1/2000 | Root et al. ..................... 482/8 |
| 6,014,491 A | 1/2000 | Hair ............................... 386/31 |
| 6,025,868 A | 2/2000 | Russo ............................ 348/3 |
| 6,029,141 A | 2/2000 | Bezos ............................ 705/27 |
| 6,032,130 A | 2/2000 | Alloul et al. ................... 705/27 |
| 6,052,554 A | 4/2000 | Hendricks et al. ............ 455/5.1 |
| 6,064,980 A | 5/2000 | Jacobi et al. .................. 705/26 |
| 6,067,107 A | 5/2000 | Travaille et al. ............... 348/1 |
| 6,073,372 A | 6/2000 | Davis ........................ 40/124.16 |
| 6,081,785 A | 6/2000 | Oshima et al. ................ 705/1 |
| 6,088,722 A | 7/2000 | Herz et al. ..................... 709/217 |
| 6,091,883 A | 7/2000 | Artigalas et al. .............. 386/83 |
| 6,105,024 A * | 8/2000 | Graefe et al. .................. 707/7 |
| 6,115,348 A | 9/2000 | Guerra .......................... 369/112 |
| 6,119,096 A | 9/2000 | Mann et al. .................... 705/5 |
| 6,138,106 A * | 10/2000 | Walker et al. ................. 705/26 |
| 6,148,142 A | 11/2000 | Anderson ..................... 386/125 |
| 6,148,428 A | 11/2000 | Welch et al. ................... 714/752 |
| 6,150,964 A | 11/2000 | McLaughlin .................. 341/59 |
| 6,151,600 A | 11/2000 | Dedrick ........................ 707/10 |
| 6,175,840 B1 | 1/2001 | Chen et al. .................... 707/501 |
| 6,177,931 B1 | 1/2001 | Alexander et al. ........... 845/327 |
| 6,233,389 B1 | 5/2001 | Barton et al. .................. 386/46 |
| 6,233,682 B1 | 5/2001 | Fritsch ........................... 713/168 |
| 6,240,401 B1 | 5/2001 | Oren et al. ..................... 705/40 |
| 6,269,394 B1 | 7/2001 | Kenner et al. ................. 709/217 |
| 6,385,596 B1 | 5/2002 | Wiser et al. .................... 705/51 |
| 6,424,998 B2 | 7/2002 | Hunter ........................... 709/207 |
| 6,430,603 B2 | 8/2002 | Hunter ........................... 709/203 |
| 6,438,579 B1 | 8/2002 | Hosken ......................... 709/203 |
| 6,460,046 B1 * | 10/2002 | Meek ............................. 707/102 |
| 6,463,467 B1 | 10/2002 | Mages et al. .................. 709/218 |
| 6,470,490 B1 * | 10/2002 | Hansen .......................... 717/106 |
| 6,496,822 B2 | 12/2002 | Rosenfelt et al. .............. 707/9 |
| 6,522,769 B1 | 2/2003 | Rhoads et al. ................. 382/100 |
| 2001/0002852 A1 | 6/2001 | Kwoh ............................ 348/465 |
| 2001/0003846 A1 | 6/2001 | Rowe et al. .................... 725/47 |
| 2001/0005906 A1 | 6/2001 | Humpleman .................. 725/82 |
| 2001/0010045 A1 | 7/2001 | Stefik et al. .................... 705/51 |
| 2001/0010095 A1 | 7/2001 | Ellis et al. |
| 2001/0013037 A1 | 8/2001 | Matsumoto .................... 707/5 |
| 2001/0013120 A1 | 8/2001 | Tsukamoto .................... 725/5 |
| 2001/0014882 A1 | 8/2001 | Stefik et al. .................... 705/51 |
| 2001/0016836 A1 | 8/2001 | Boccon-Gibod et al. ....... 705/51 |
| 2001/0017920 A1 | 8/2001 | Son et al. ....................... 380/212 |
| 2001/0018742 A1 | 8/2001 | Hirai ............................. 713/193 |
| 2001/0018858 A1 | 9/2001 | Dwek ............................ 84/609 |
| 2001/0023416 A1 | 9/2001 | Hosokawa ..................... 705/51 |
| 2001/0023417 A1 | 9/2001 | Stefik et al. .................... 705/57 |
| 2001/0023428 A1 | 9/2001 | Miyazaki et al. ............. 709/201 |
| 2001/0024425 A1 | 9/2001 | Tsunoda et al. ............... 370/82 |
| 2001/0024566 A1 | 9/2001 | Mankovitz .................... 386/83 |
| 2001/0025259 A1 | 9/2001 | Rouchon ....................... 705/26 |
| 2001/0025269 A1 | 9/2001 | Otsuka .......................... 705/52 |
| 2001/0025316 A1 | 9/2001 | Oh ................................. 709/231 |
| 2001/0027561 A1 | 10/2001 | White et al. .................... 725/1 |
| 2001/0027563 A1 | 10/2001 | White et al. .................... 725/46 |
| 2001/0029491 A1 | 10/2001 | Yoneta et al. .................. 705/53 |
| 2001/0029538 A1 | 10/2001 | Blockton et al. .............. 709/226 |
| 2001/0029583 A1 | 10/2001 | Palatov et al. ................. 713/193 |
| 2001/0030660 A1 | 10/2001 | Zainoulline ................... 345/720 |
| 2001/0031066 A1 | 10/2001 | Meyer et al. .................. 382/100 |
| 2001/0032131 A1 | 10/2001 | Mowry .......................... 705/14 |
| 2001/0032132 A1 | 10/2001 | Moran ........................... 705/14 |
| 2001/0032133 A1 | 10/2001 | Moran ........................... 705/14 |
| 2001/0032187 A1 | 10/2001 | Nuttall .......................... 705/57 |
| 2001/0032312 A1 | 10/2001 | Runje et al. ................... 713/172 |
| 2001/0034635 A1 | 10/2001 | Winters ......................... 705/10 |
| 2001/0034714 A1 | 10/2001 | Terao et al. .................... 705/57 |
| 2001/0034883 A1 | 10/2001 | Zigmond ....................... 725/109 |
| 2002/0057799 A1 | 5/2002 | Kohno |
| 2002/0062261 A1 | 5/2002 | Mukai |
| 2002/0066025 A1 | 5/2002 | Sato |
| 2002/0073038 A1 | 6/2002 | Oshima et al. |

FOREIGN PATENT DOCUMENTS

| | | | | |
|---|---|---|---|---|
| EP | 0 975 111 A2 | 1/2000 | ............ H04H/9/00 |
| EP | 0 977 389 A2 | 2/2000 | ............ H04H/9/00 |
| EP | 0 984 631 A1 | 3/2000 | ............ H04N/7/173 |
| EP | 0 994 470 A2 | 4/2000 | ............ G11B/7/24 |
| EP | 1 104 195 A2 | 5/2001 | ............ H04N/7/24 |
| EP | 1 143 721 A1 | 10/2001 | ............ H04N/5/782 |
| EP | 0 756 423 B1 | 1/2003 | |
| GB | B 2300498 A * | 11/1996 | ............ G06F/3/08 |
| JP | 07325740 A * | 12/1995 | ............ G06F/12/00 |
| JP | 2002 015333 A | 1/2002 | |
| JP | 2002 099283 A | 4/2002 | |
| JP | 2002 156979 A | 5/2002 | |
| WO | WO 91/03112 | 3/1991 | ............ H04H/1/00 |
| WO | WO 94/13107 A1 | 6/1994 | ............ H04N/7/16 |
| WO | WO 96/26605 | 8/1996 | ............ H04H/7/00 |
| WO | WO96/34466 | 10/1996 | ............ H04H/1/00 |
| WO | WO96/34467 | 10/1996 | ............ H04H/1/00 |
| WO | WO96/34494 | 10/1996 | ............ H04N/7/173 |
| WO | WO 9733241 A1 * | 9/1997 | ............ G06F/17/30 |
| WO | WO 99/18727 | 4/1999 | ............ H04N/7/01 |
| WO | WO 00/05886 A1 | 2/2000 | ............ H04N/7/16 |

| | | | | |
|---|---|---|---|---|
| WO | WO 00/07368 | 2/2000 | .......... | H04N/5/775 |
| WO | WO 01/01677 A1 | 1/2001 | .......... | H04N/5/445 |
| WO | WO 01/41013 A1 | 6/2001 | ........... | G06F/17/60 |
| WO | WO 01/47249 | 6/2001 | ............ | H04N/5/00 |
| WO | WO 01/74050 A2 | 10/2001 | | |
| WO | WO 200296087 A1 * | 11/2002 | | |

OTHER PUBLICATIONS

From http://www.archives.net, a history of Internet operation of eBay.com and amazon.com.

http://www.archives.net for a history of operation on the Internet of eBay.com.

http://www.eBay.com, eBay travel sections.

*Standard ECMA–267*, 3$^{rd}$ Edition, April 2001, "120 mm DVD—Read–Only Disk."

"Wink Television Press Room," http://www.wink.com/contents/PressReleases.shtml, downloaded and printed on May 14, 2002.

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.

"Wink Communications, Inc., Changes the Advertising Landscape," http://www.wink.com/contents/PressReleases/930709807/content.shtml, downloaded and printed on May 14, 2002, dated Jan. 21, 1999.

"Wink's History," http://www.wink.com/contents/history.shtml, downloaded and printed on May 14, 2002.

"How Wink Works," http://www.wink.com/contents/howitworks.shtml, downloaded and printed on May 14, 2002.

"What is Wink: Examples," http://wink.com/contents/examples.shtml, downloaded and printed on May 14, 2002.

"The Wink System," http://www.wink.com/contents/tech_diagram.shtml, downloaded and printed on May 14, 2002.

"Wink Response Server and Wink Response Network," http://www.wink.com/contents/tech_wrs.shtml, downloaded and printed on May 14, 2002.

"ICAP and HTML (ATVEF)," http://www.wink.com/contents/tech_icap.shtml, downloaded and printed on May 14, 2002.

"Wink Studio and Wink Server Studio," http://www.wink.com/contents/tech_studio.shtml, downloaded and printed on May 14, 2002.

"Wink Broadcast Server," http://www.wink.com/contents/tech_wbs.shtml, downloaded and printed on May 14, 2002.

"Wink Client Software," http://www.wink.com/contents/tech_engine.shtml, downloaded and printed on May 14, 2002.

"DataPlay, Inc.—Universal Recording Media—Discover," http://www/dataplay.com/jsp_files/en/discover/index–music.jsp, downloaded and printed on May 14, 2002, (Copyright 2001).

"DataPlay, Inc.—Universal Recording Media—What's Playing on DataPlay," http://www/dataplay.com/servlets/ProductList?action=productSearch, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).

"DataPlay, Inc.—Universal Recording Media—Industry," http://www.dataplay.com/jsp_files/en/industry/products–digitalmedia.jsp, downloaded and printed on May 14, 2002, (Copyright 2001).

"DataPlay, Inc.—Universal Recording Media—Industry," http://www.dataplay.com/jsp_files/en/industry/products-engines.jsp, downloaded and printed on May 14, 2002, (Copyright 2001).

"DataPlay, Inc.—Universal Recording Media—Industry," http://www.dataplay.com/jsp_files/en/industry.contentproviders.jsp, downloaded and printed on May 14, 2002, (Copyright 2001).

"DataPlay, Inc.—Universal Recording Media—Industry," http://www.dataplay.com/jsp_files/en/industry/products–contentkey.jsp, downloaded and printed on May 14, 2002, (Copyright 2001).

"DataPlay, Inc.—Universal Recording Media—Industry," http://www.dataplay.com/jsp_files/en/industry/index.jsp, downloaded and printed on May 14, 2002, (Copyright 2001).

"What's Playing on DataPlay—Everything Digital," DataPlay Micro–optical Engine Product Brochure, downloaded and printed on May 14, 2002, (Copyright 2000–2002).

"What's Playing on DataPlay—Everything Digital," DataPlay Digital Media Product Brochure, downloaded and printed on May 14, 2002, (Copyright 2000–2001).

"Calimetrics' Multilevel Technology Enables Higher–Performance CD/DVD Recorders: An IDC White Paper," Wolfgang Schlichting, (Copyright 2000).

"Making Digital Cinema Actually Happen—What it Takes and Who's Going to Do It." Steven A Morley, (Copyright 1998).

"Streaming Onto the Movie Screen, with Nary a Scratch", Karen J. Bannan, The New York Times, May 9, 2002, p. E5.

U.S. patent application No. 09/465,730 Charles Eric Hunter et al. (filed May 17, 2000).

U.S. patent application No. 09/976,836 Charles Eric Hunter et al. (filed Oct. 12, 2001).

* cited by examiner

"YOU HAVE ORDERED A 20 CU. FOOT
SIDE BY SIDE REFRIGERATOR FOR $650."

↓

"WE RECOMMEND SHIPPING UPS FOR $37.
PUSH 4 TO ACCEPT THIS SHIPPING OPTION.
PUSH 5 FOR FASTER SHIPPING OR 6 FOR
CHEAPER SHIPPING."

↓ PUSH 4

"WE RECOMMEND INSURING SHIPMENT
FOR $3. PUSH 7 TO ACCEPT THIS INSURANCE
OPTION. PUSH 8 FOR MORE. PUSH 9 FOR LESS."

↓ PUSH 7

"TOTAL FOR REFRIGERATOR WITH SHIPPING,
INSURANCE AND STATE TAX IS $725.
PRESS 1 TO COMPLETE THE TRANSACTION."

↓ PUSH 1

COMPLETE

FIG.1C

| NUMBER OF COMPANYS ("MERCHANTS") | COMPANY DIGITS | PRODUCT DIGITS AVAILABLE | MAXIMUM PRODUCT COMBINATIONS PER COMPANY |
|---|---|---|---|
| 10 | 2 | 8 | 100 MILLION |
| 200 | 3 | 7 | 10 MILLION |
| 1,000 | 4 | 6 | 1 MILLION |
| 10,000 | 5 | 5 | 100 THOUSAND |
| 100,000 | 6 | 4 | 10 THOUSAND |
| 1 MILLION | 7 | 3 | 1,000 |
| 10 MILLION | 8 | 2 | 100 |
| 100 MILLION | 9 | 1 | 10 |
| 1 BILLION | 10 | 0 | 1 |

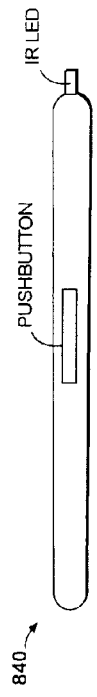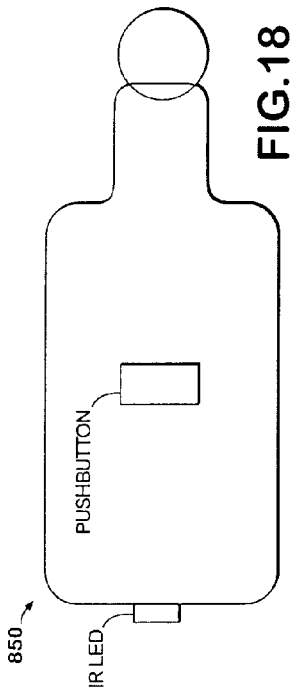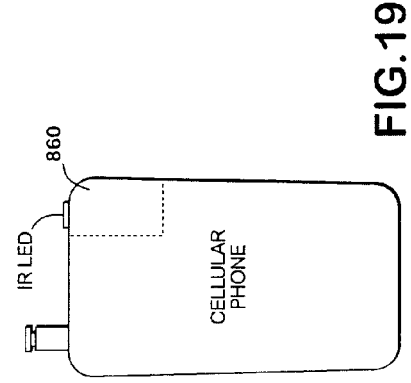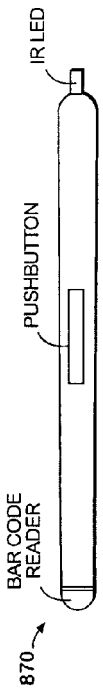

SYSTEM AND METHOD PERMITTING CUSTOMERS TO ORDER PRODUCTS FROM MULTIPLE PARTICIPATING MERCHANTS

CROSS REFERENCE TO RELATED APPLICATIONS

This application is a continuation-in-part of Ser. No. 09/567,716, filed May 10, 2000; Ser. No. 09/564,386, filed May 3, 2000; and Ser. 09/465,729, filed Dec. 17, 1999.

FIELD OF THE INVENTION

The invention relates to systems and methods by which customers purchase products from merchants. More particularly, the invention relates to a universal automated order processing system and method by which customers may order a product, preferably by telephone or interactive TV, by accessing a central system that processes and routes a complete product order to the appropriate one of multiple (e.g., hundreds or thousands) participating merchants.

BACKGROUND OF THE INVENTION

Over time, consumer/merchant product purchase transactions have evolved from early barter-type transactions to the three forms of transactions that predominate in the modern economy.

First are face-to-face transactions (for example, involving the customer and a retail store, street vendor, or the like) where payment is made by cash, bank check or credit card. While these face-to-face transactions will always be a part of the economy, they are generally limited to those products that are readily available for exchange at the site of the transaction.

Secondly are conventional "mail order" purchases typically made by telephone calls to operators representing the mail order company. These purchases are usually made through catalog services, but may be through a retail store or, in a TV marketing context, through a vendor that has advertised on television. Payment for these types of purchases are usually by bank check or credit card, with credit card payment being preferred to avoid delays occasioned by mailing the customer's check to the merchant and "clearing" of the check through the banking system. Deliveries of mail order purchases are usually by common carrier, such as United Parcel Service, Federal Express, or the like. While mail order services greatly enhance customer options and provide a convenience, the cost of order processing may exceed 20% of sales due in large part to the high cost of the necessary telephone operators. Additionally, in times of low unemployment and with the expected changing demographics of the work force, it is likely to be exceedingly difficult to recruit and retain workers in sufficient numbers at reasonable wages and with sufficient skills to maintain the current cost structures of retail mail order processing.

The third form of consumer/merchant transactions in the modern economy is purchasing through computers that are interconnected through communication links, for example, orders of products over the Internet. Internet purchases are almost exclusively paid for by credit cards. Drawbacks to the current Internet purchasing model include the occasional difficulties in logging on as well as the unfamiliar and cumbersome process necessary to page through an electronic catalog, often resulting in enough frustration that potential purchasers simply do not attempt the effort. Vast numbers of "computer savvy" consumers simply refuse to use Internet purchasing systems for these reasons. Additionally, there is the problem of sensitive information, primarily credit card numbers, being routed through the nodes of computer systems that are located throughout the world. Large numbers of computer savvy customers refuse to use the Internet purchasing systems for security reasons alone. As another consideration, the entire Internet purchasing model is brought into question by the well-documented financial losses on operations suffered by this segment of the economy. Published reports indicate that the 241 largest retail Internet merchants in the United States are currently losing approximately seven billion dollars per year on net sales of 20 billion dollars per year—bringing into question the viability of the Internet based retail selling business model. Lastly, vast numbers of people, currently a substantial majority of consumers in the United States, simply do not have home-based access to the Internet or do not have the computer skills or confidence to engage in Internet purchase transactions. While optimistic projections see this problem declining over time, there clearly is a ceiling on the percentage of the population who will use this model even five or ten years in the future. As evidence of the reluctance of a solid core of citizens to use Internet ordering either now or in the future is the fact that only fifteen to twenty percent of video cassette recorder (VCR) purchasers learn to program their VCR's to record programming for time shifting purposes—or even master the steps necessary to set the VCR's clock.

Another issue not addressed by promoters of the Internet model for consumer purchase transactions is the inability of relatively small vendors to offer products independently without the significant overhead attributed to the so-called "back office operations" associated with order processing. An order processing system that would permit small vendors to economically and efficiently process orders would open up a limitless number of business opportunities and further enhance choice and price competition to the benefit of consumers and the economy as a whole.

Telephone technology appears to have been largely overlooked in the current rush to Internet based consumer product purchase transactions. Telephone access is essentially universal in developed countries throughout the world, with compatible protocols and systems interconnecting the entire globe. Telephones are easy to use and become more so every day. Virtually everyone is comfortable with telephone communications and appreciates the convenience they afford. The versatility and options offered by telephones are ever expanding, while the cost of calls is dropping dramatically. Long distance toll charges in the year 2010, including international calls, are likely to drop to on the order of one to three cents per minute, with many calls close to being free. Cellular phones are becoming so small that they may be carried in even the smallest purse, and with further miniaturization, cellular phones will be carried with the ease of a credit card. Lastly, and importantly, the phone system offers a level of security to the information transmitted, whether voice or data, that is sufficient to meet the requirements of the most security sensitive consumers and merchants.

While the above-mentioned forms of customer/merchant purchase transactions presently support a vibrant and ever expanding consumer-based economy, a new system for initiating and completing purchase transactions that overcomes the above drawbacks is desirable to facilitate product ordering by consumers and to further drive the economy in the new millennium. A new system utilizing time-tested and ever improving telephone technology offers exceptional promise, with the prospect that the system will also utilize promising emerging technologies.

SUMMARY OF THE INVENTION

The present invention, in one broad respect, is an order processing system and method permitting ordinary consumers to set up accounts with the system and thereafter order products from a vast array of products offered by multiple participating merchants who have agreed to offer their respective products for sale through the system. The array of products is limitless, subject only to the level of participation by the merchants who offer products. Access to the system is made quick and simple so that virtually anyone will feel comfortable using the system. In certain embodiments, orders can be placed by a telephone call, preferably a call dialed by pressing a single button, followed by the system automatically identifying the call by call no. ID, voice verification, or both, followed by the customer simply entering the product number for the product desired. The order is automatically processed by the system and a processed order is automatically routed in electronic form to the participating merchant who will fulfill the order without further need for contact with the consumer. Either the participating merchant or the operator of the central order processing system may assume responsibility for verifying available credit at the time of the purchase. The operator of the system may also offer revolving credit. The system may also be used to automatically provide customers with free product information by e-mail, mail or telephone.

In one aspect, the invention may be defined as an order processing system permitting customers who have already provided customer information to the system to order selected products from a vast array of products offered by multiple participating merchants. The system includes a product/merchant database with information corresponding to an order number assigned to each product offered through the system. Each order number identifies a unique product and an associated merchant offering the product. A customer database includes a customer information set for each system customer. The information set includes customer identification, customer address information and method of payment information. Incoming product orders from customers who have connected to the system are received via a system address with the customer being automatically identified. Each incoming customer order is matched to the customer information set for that customer and to a participating merchant. The customer information and identification of the product being ordered is communicated in electronic form to the participating merchant that provides the ordered product so that the merchant can fulfill the order. POTS and cellular telephone are the preferred means for customers placing orders, with the customer's identity being automatically determined by call no. ID and/or voice recognition. Alternative communications technologies include satellite paging, person digital assistant (PDA), radio LAN and interactive TV. Dedicated ordering devices may be provided to system customers by the system operator.

In another aspect, the invention may be defined as a method permitting customers to use an order processing system to order selected products from a vast array of products offered by multiple participating merchants. The method includes establishing accounts between the order processing system and merchants who have agreed to offer their respective products for sale. An order number is assigned to each product offered by the participating merchants. The method establishes a customer database including a customer information set for each customer, with the information set including customer identification, customer address information and method of payment information. Each customer, when desiring to place a product order, utilizes a system address to establish contact with the system and enters the order number for the product desired. Each customer placing an order is automatically identified. Each incoming customer order is matched to the customer information set for that customer. Customer information and identification of the product being ordered is communicated in electronic form to the participating merchant that provides the ordered product so that the merchant can fulfill the order.

BRIEF DESCRIPTION OF THE DRAWINGS

Some of the features of the invention having been stated, other features will appear as the description proceeds, when taken in connection with the accompanying drawings, in which

FIG. 1C shows a shipment choice narrative associated with the embodiment of FIG. 5.

FIG. 17 depicts a dedicated ordering device having the configuration of a flashlight or pen.

FIG. 18 depicts a dedicated ordering device having the configuration of an electronic car key device.

FIG. 19 depicts a dedicated ordering device integrated with a cellular phone.

FIG. 21 depicts a device similar to that of FIG. 17, but also including a bar code reader.

DETAILED DESCRIPTION OF THE INVENTION

Figure 1:
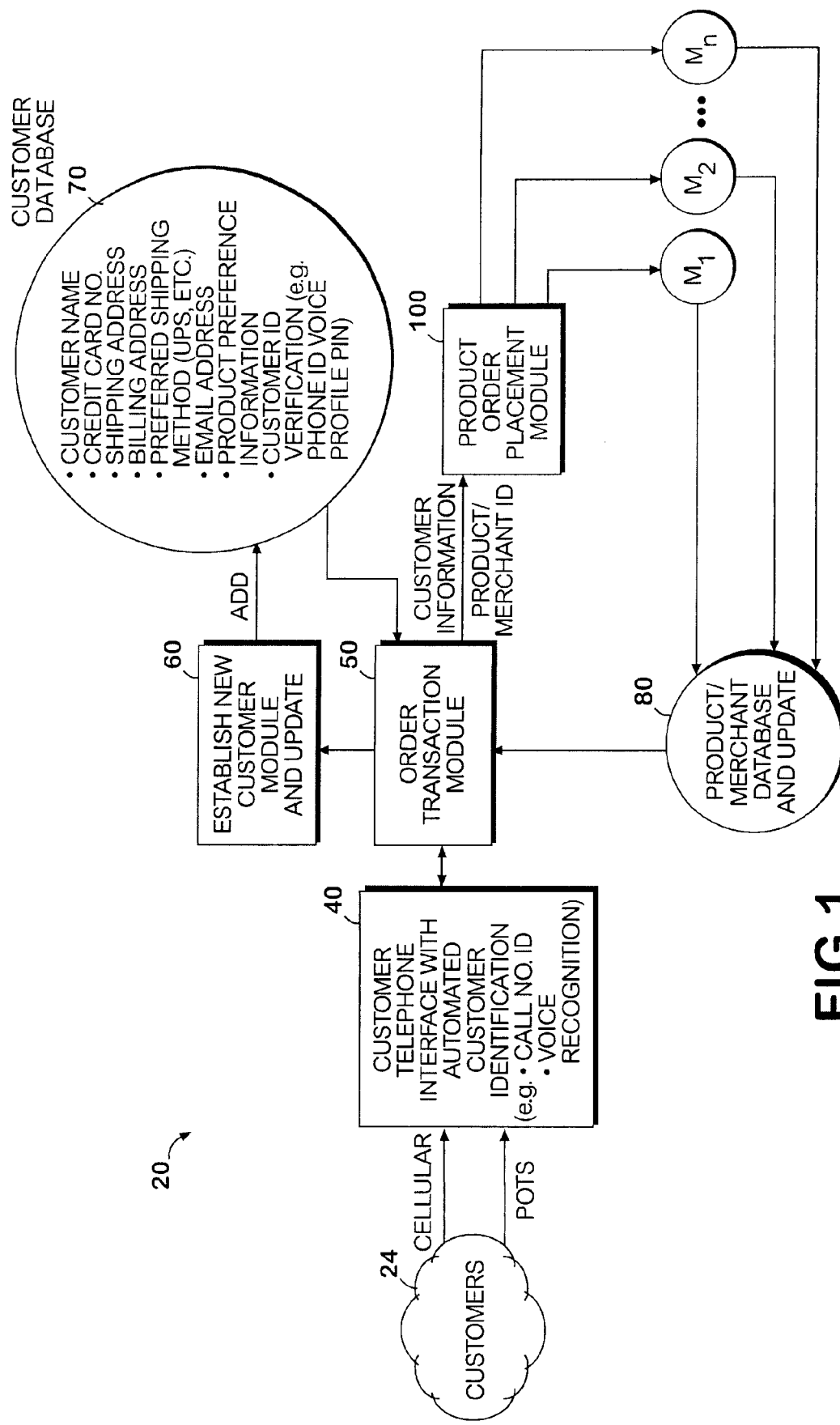
FIG. 1 is a block diagram showing one product ordering system of the invention.

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

A brief overview of the operation of the automated order processing system of the invention will now be set forth from a customer's perspective, followed by a detailed description of the system, its components, alternative embodiments and other details of structure and operation. System 20 (FIG. 1) serves to automatically receive and process product orders from system customers 24 and route sufficient information to participating merchants $M_1$, $M_2$, ... $M_N$ so that the merchants can fulfill the orders. The participating merchants advertise their products through conventional advertising media such as catalogs, television, radio, newspapers, magazines, single message billboards, electronic billboards, point of purchase displays, and the like. The advertisements include information indicating that the advertised products are available through system 20. The advertisements typically include a system address (e.g., a system telephone number accessible by a single preprogrammed button or speed dial). The advertisements also include a unique order number for each product that the merchants offer for sale through system 20. Referring to FIG. 1A, a representative television advertisement 30 is shown that advertises a product (a golf club) offered for sale through system 20 by a participating merchant (Golf Magic Company). The advertisement includes the usual product information provided to inform and persuade potential customers, as well as the following notation:

TO BUY PHONE WT

ORDER PRODUCT NO. 653

In this illustrative situation, system 20 is referred to as "WT", the initials of the system operator, World Theatre. A full telephonic system address is also provided at the bottom of the advertisement by which the customer may access system 20 via a POTS (Plain Old Telephone System) toll-free "800" number. Additionally, a toll-free cellular linking number (not shown) may be provided. As mentioned above, it will be appreciated that the 800 number may be programmed into speed dial by customers of the "WT" system 20 or, in the alternative, telephones may be marketed with a single-touch keypad button labeled "WT" that automatically dials the system address of system 20. Likewise, cellular telephones may be programmed to speed dial either the 800 number or the cellular linking number, or provided with a single keypad button that automatically dials one of these numbers. The product order number 653 is a number assigned to the particular advertised product and serves also to identify the participating merchant who will fulfill orders for the product. The same product may also be offered through a catalog (FIG. 1B) where the consumer has the option of using the catalog to call in a product order or using the WT system product order number depending upon whether the customer wishes to order directly through system 20. In this regard, WT system product order numbers may be displayed in Internet based "electronic catalogs" as well as in print catalogs.

In a representative situation where a customer responds to advertisement 30, the customer using POTS dials or speed dials the 800 number of system 20 and connects to a customer telephone interface 40 that automatically identifies the customer by automated identification technology (e.g., "call no. ID") or voice recognition technology or other suitable means. The customer then responds to a prompt from telephone interface 40 and enters the product order number. The customer may then hang up or await a confirmation and other ordering options that may be offered.

It will be appreciated that in preferred embodiments, first-time users of the system will need to supply sufficient information so that they may be identified and accepted as a customer in good standing, before they can place orders.

Figure 1B:
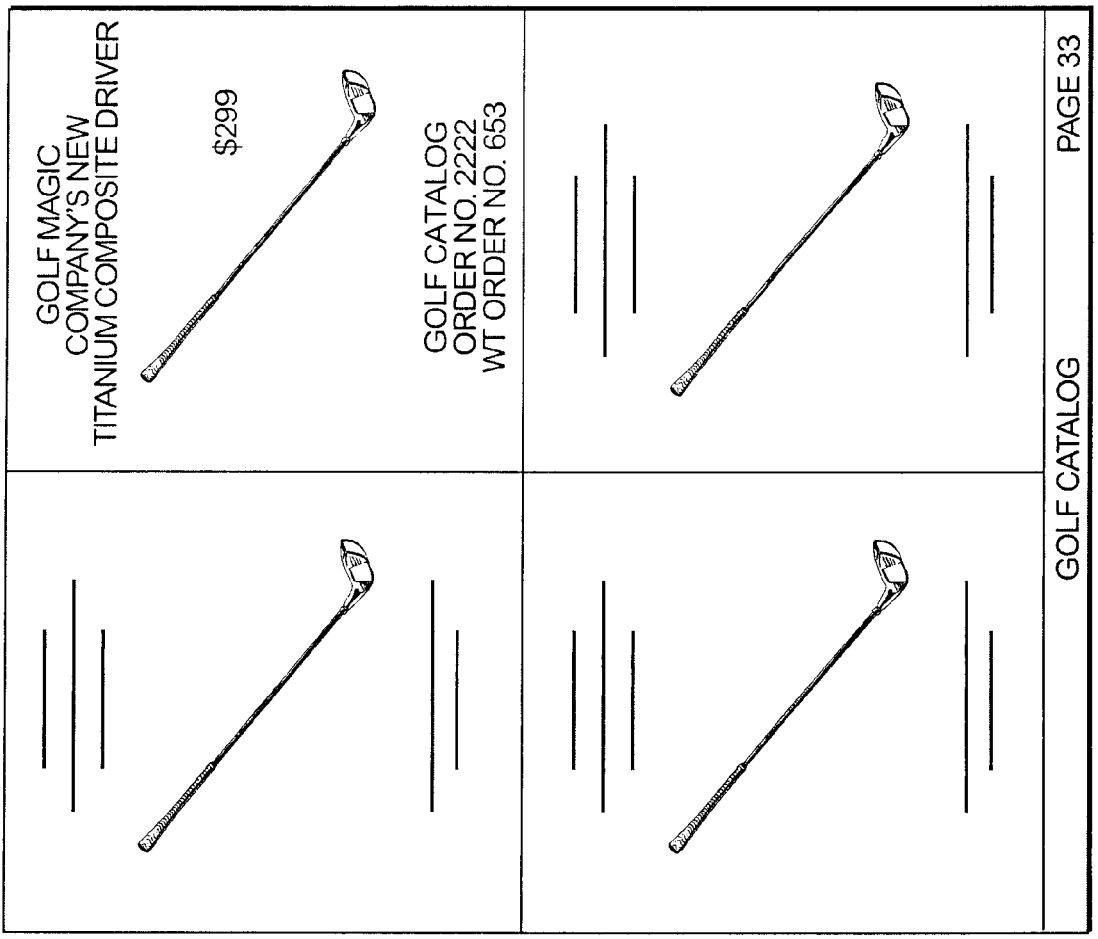
FIG. 1B shows a portion of a page from a mail order catalog providing the customer the option of ordering the catalog item through the automated order processing system of the invention.
Figure 1A:
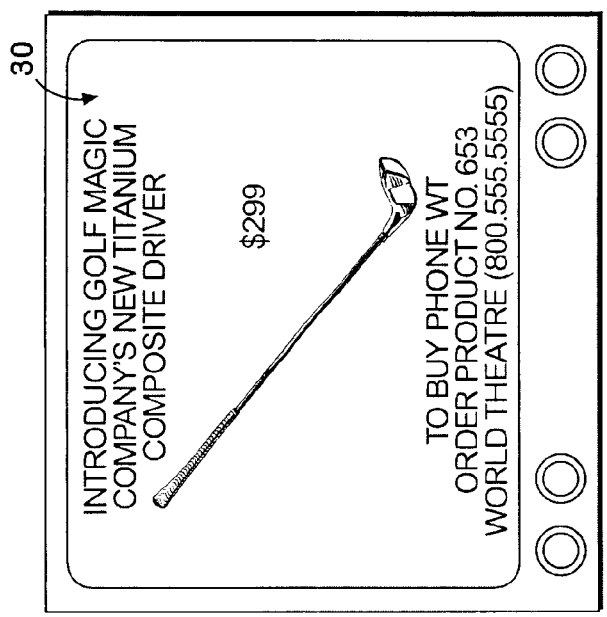
FIG. 1A shows a television advertisement for a product available through the ordering system of FIG. 1.

Referring now to FIG. 1, automated order processing system 20 includes a customer telephone interface 40 for receiving telephone calls from customers, an order transaction module 50, an establish new customer module 60 that communicates with module 50 and a customer database 70, a product/merchant database 80, and an order placement module 100 that communicates sufficient information to participating merchants $M_1$, $M_2$, ... $M_N$ to enable the merchants to fulfill orders. It will be appreciated that system 20 of FIG. 1 may be implemented utilizing a single computer system with data flow as shown or by multiple computers/databases accomplishing the same functions.

Customer telephone interface 40 serves as a means for receiving incoming product orders from customers who connect to the system via a system address, in this case a toll-free telephone number (e.g., 800.555.5555) or a cellular linking number (e.g., *100). To this end, telephone interface 40 includes a telephony switch from companies such as Nortel or Lucent Technologies, which identifies the inbound caller number and transmits that information to a receiving database server that automatically performs a lookup on the phone number to determine the caller's identity and required information ("call no. ID"). As an alternative to, or in addition to, call no. ID technology, the customer identity may be automatically determined by a voice recognition unit (VRU) that recognizes characteristics of a customer's voice and compares those characteristics to a voice profile that the customer provides when the customer is established as a new customer. VRU technology is commercially available from various vendors, for example, VRU systems marketed by VeriVoice, Inc. of Princeton, N.J., USA.

While it is preferred to utilize customer identification employing call no. ID technology, voice recognition technology or other technologies that operate independent of information input by the customer in response to a prompt, other identification means may be used, for example, where the customer is automatically prompted to provide information such as credit card number, social security number, date of birth, personal identification number (PIN), or the like, alone or in combination, and the provided information is compared against information previously established in the customer database to verify the identity of the customer placing the call. In this regard, the term "automatically identifying each customer placing an order" is deemed to include all of the above means for identifying customers and their equivalents, with it being understood that the technologies that do not require caller response to prompts are preferred.

Following identification of the customer placing a call, customer telephone interface 40 prompts the customer to enter the product order number (e.g., 653) for the product being ordered. The prompt may be as simple as a recognizable tone, or may be a simple verbal command such as "please enter (or say) product order number". In a straightforward application, once the product order number is entered on the telephone keypad or stated verbally by the customer, the customer may hang up with or without interface 40 indicating acceptance of the order. In this regard, a suitable automated procedure following a customer's entry of an order number may be, "You have entered product number 653, a Golf Magic titanium composite driver. Please press 1 to complete your purchase of this product. Please press 2 to re-enter the product number.". The system may permit ordering multiple products in one call, verifying the carrier to be used for shipping, verifying product availability and shipping date, and conveying other forms of information that consumers may desire during the order placement call. These features will be discussed below in conjunction with the description of other embodiments of the invention.

If the customer who is calling system 20 is a new customer who has not established an account with the system, the automated customer identification feature of customer telephone interface 40 will prompt the new customer to enter information sufficient to establish the caller as a qualified customer in customer database 70. In this regard, setting up a new customer file in customer database 70 may be achieved through an establish new customer module 60 that connects the caller to an operator or connects the caller to an automated new customer telephonic data entry application. According to the embodiment of FIG. 1, the information entered into the customer database may comprise:

customer name
  credit card number
  shipping address
  billing address
  preferred shipping method (UPS, FED EX, etc.)
  e-mail address
  phone number
  customer product preference information (e.g., pepperoni topping on pizzas)
  customer ID verification (e.g., phone ID, voice recognition or PIN).

This information is entered into the customer database as an information set for that particular customer.

A second database, product/merchant database 80, includes information corresponding to the order numbers assigned to each product offered through the system by the participating merchants. Each order number identifies a unique product and an associated merchant offering that product. Database 80 receives periodic updates from merchants $M_1, M_2, \ldots M_N$.

Order transaction module 50 employs information from the product/merchant database for matching each incoming customer order to a participating merchant. Transaction module 50 also has access to customer information supplied from customer database 70 so that, in conjunction with order placement module 100, the necessary information may be communicated to the appropriate merchant to permit the merchant to fulfill the order. According to the embodiment illustrated in FIG. 1, communications to the merchants may be accomplished by a product order placement module utilizing, for example, a telephone/modem connection. A single server (e.g., an IBM RISC server) at the participating merchant's order receiving facility can receive tens of thousands of telephone/modem orders from system 20 per day. High volume merchants may choose to have dedicated phone line(s) for this purpose.

While not illustrated in FIG. 1, the participating merchant that will fulfill the order may confirm receipt of the order to the customer by electronic mail, mail, telephone or other suitable means.

In the embodiment of FIG. 1, the responsibility for verifying available credit and other aspects of handling credit transactions rests with the participating merchants.

Figure 2:
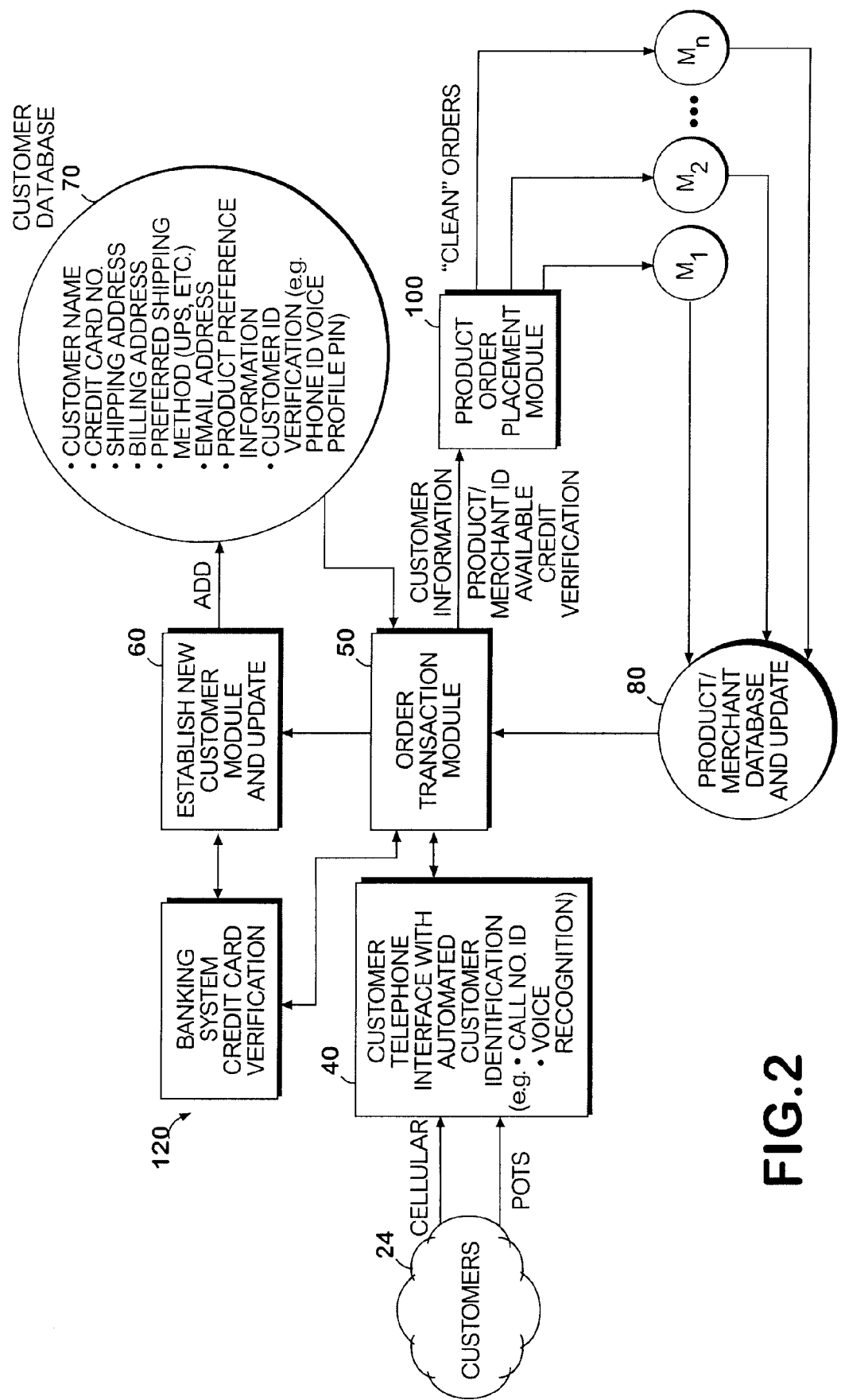
FIGS. 2–6 show automated product ordering systems similar to that of FIG. 1 but including additional or modified features.

FIG. 2 illustrates an alternative automated order processing system 120 that is identical to system 20 of FIG. 1 except that the responsibility for verifying available credit of the customers is that of the operator of system 120. According to this embodiment, preferably the credit card information supplied by a new customer is verified through the banking system at the time the new account is set up through establish new customer module 60. Then, each time an order is placed by a customer with the typical credit card method of payment, the available credit is verified by system 120 so that the processed order sent to the merchant by product order placement module 100 is a "clean" order, ready for fulfillment and shipment.

Figure 3:
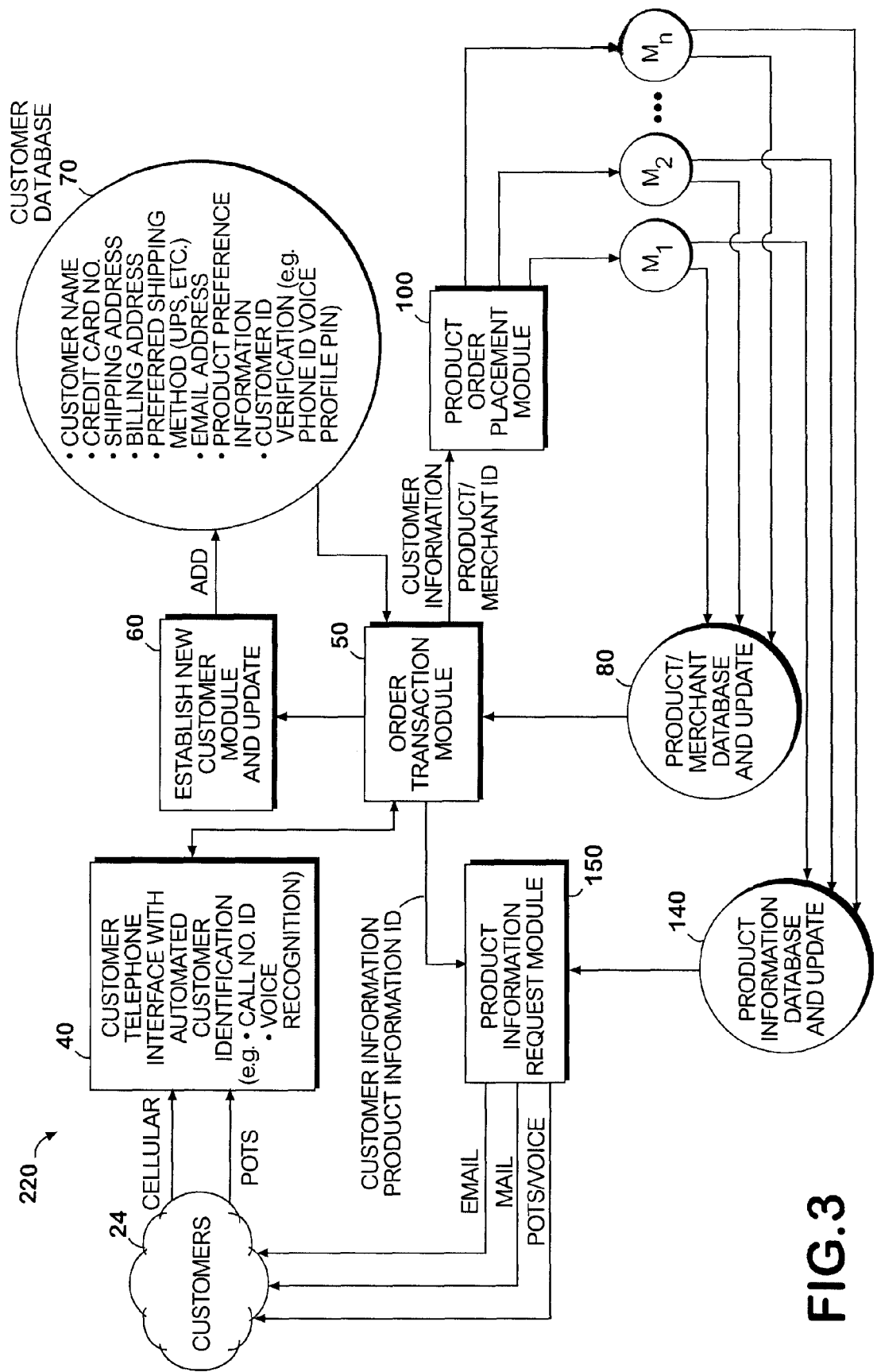

FIG. 3 illustrates another automatic order processing system 220 that permits customers to not only order products, but also to order (usually free) information about products. For example, the television advertisement of FIG. 1A may be modified to carry an additional line as follows:

For information only, enter information order number 24681357.

A product information database 140 stores discrete information packages that may be ordered by system customers. When a product information order number is recognized by system 220, it is routed to product information request module 150 that calls up the requested information package from database 140 and transmits it to the customer by the customer's preferred transmission mode, as reflected in the customer's information set in customer database 70. Most typically, the information package is transmitted by e-mail, mail or POTS/voice, although other means may be used.

Figure 4:
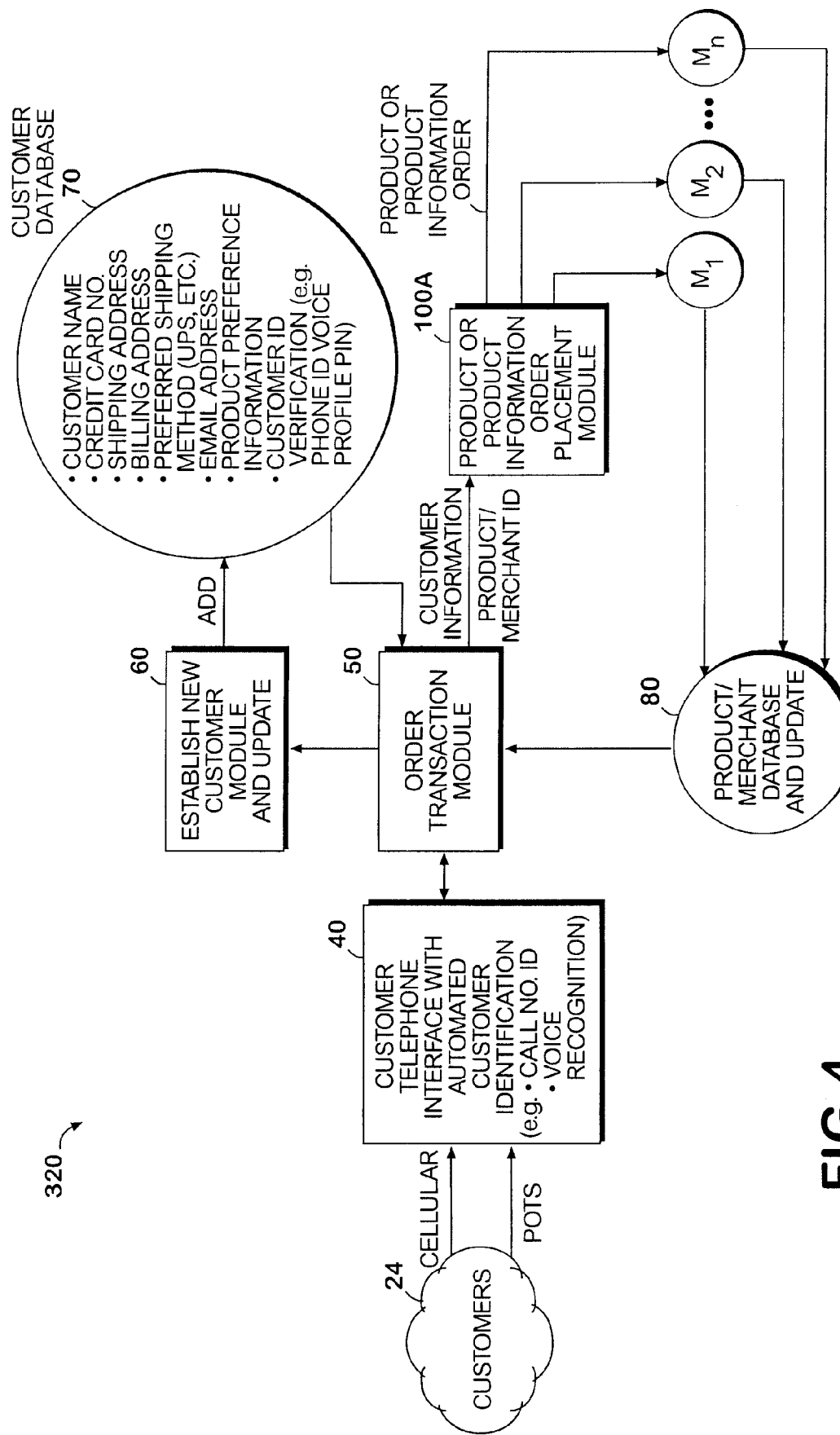

FIG. 4 illustrates another automated product order processing system 320 that also provides product information ordering capability, but the information request is simply processed like a product order and sufficient information is sent to the appropriate merchant to enable the merchant to fulfill the information request. For example, when a caller responds to an advertisement requesting product information only, system 320 processes the information order and sends customer information plus the identity of the information requested to the participating merchant through product or product information order placement module 100A. The merchant would then fulfill the customer's request for product information. It will be appreciated that a customer's information request serves as a "lead" in the hands of the merchant so that the merchant may utilize that information to follow up as appropriate with the customer. In this regard, the information order fulfillment system 220 discussed immediately above in connection with FIG. 3 may also operate so that all information packages sent out by module 150 are followed by a message to the appropriate merchants so that the merchants may have leads.

Figure 5:
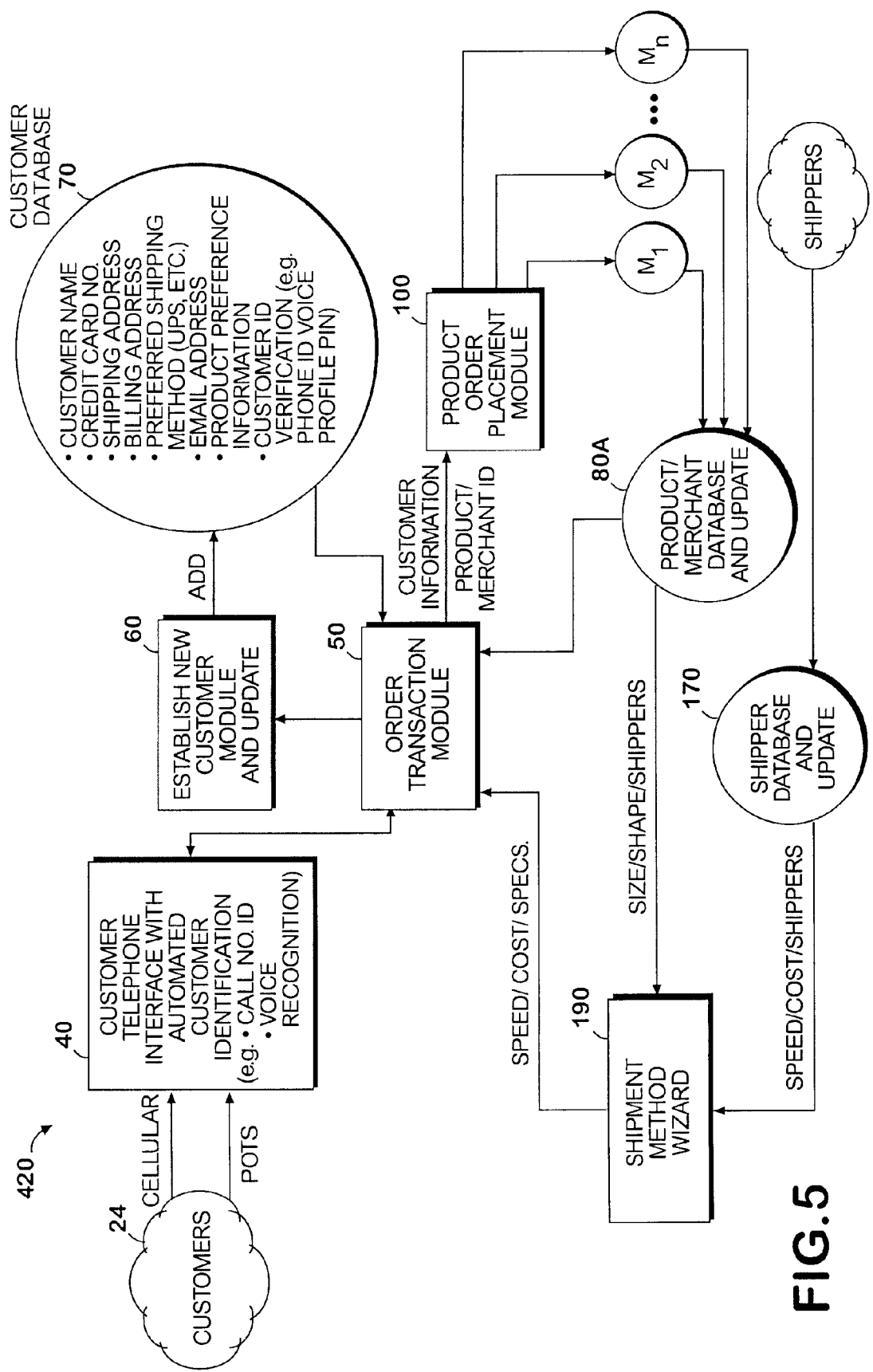

FIG. 5 illustrates an automatic order processing system 420 that provides shipping information and analysis for ordered products. Preferably, the shipping information is automatically presented to the customer when an order is placed for acceptance by the customer in accordance with either a "tone" or "voice" protocol. According to this embodiment, a shipper database 170 is provided for storing available shipping options through several shippers. Also, the product/merchant database 80A includes information concerning the size, shape, weight and other shipping related specifications of the offered products. The information in databases 170 and 80A are accessible to a shipment method wizard 190 that processes the information to provide speed/cost/shipper choices to order transaction module 50. These options may be communicated to the customer by a narrative such as that set forth in FIG. 1C.

Figure 6:
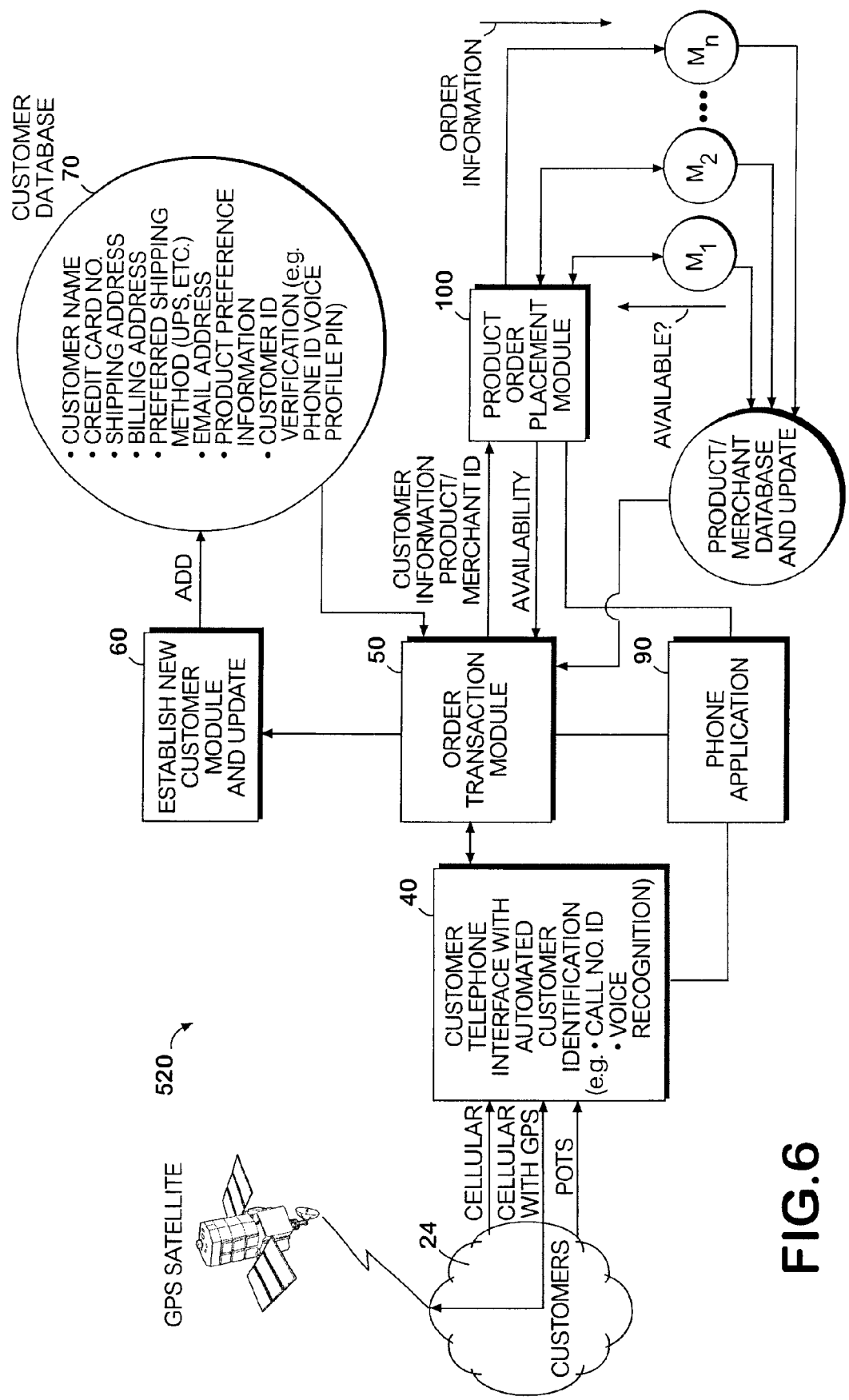

FIG. 6 is a view of another automated order processing system 520 that permits the system to verify product availability to the customer at the time the order is placed. System 520 includes links to the merchants' inventory control computers so that the system can query the appropriate merchant when an order is placed to assure availability of the ordered product and that a tag is placed in the inventory control system to assure that the product is available for the system customer. This information link permits system 520 to confirm availability after the product order is entered by the customer through an automated voice message such as, "The product you ordered is in stock and will be shipped within 48 hours.". As an alternative to the computer links of FIG. 6, the operator of the system may have a blanket policy known to merchants and customers alike that all orders that are accepted will be shipped within a set period of time, e.g., 72 hours. According to this implementation of the invention, the product/merchant database is updated by the merchants on an ongoing basis to place products on "back order"/unavailable status when they are not available, and to restore products to available status when they are back in inventory. Thus, all orders accepted by the system may be for available, in stock products. When a product is unavailable, the customer can simply be informed by an automated voice message such as, "The product you ordered is not in stock.".

FIG. 6 illustrates a second additional feature whereby customers may access system 520 with a GPS capable device, for example, a cellular telephone with GPS capability. In this regard, global positioning systems are becoming more and more user friendly. They are so easy to use now that they can communicate a user's location with a simple click of a button. The knowledge of a person's whereabouts during an order to system 520 via cell phone or other device such as a PDA device, can provide some significant benefits.

Once a customer makes a connection to the system 520 with a GPS device, the system can determine if the customer is located in an establishment that has registered as a merchant in the system database. (In this embodiment, the database stores GPS location information for participating merchants and their perspective outlet and/or retail locations.) If the customer is located inside a registered establishment, then the user may be prompted through a voice response unit to verify his location and the merchant name for the transaction. Once the transaction is complete, the merchant receives the store or outlet location responsible for the sale so the merchant can provide the proper accounting and sales credits needed for the transaction.

If the customer is outside of a registered merchant location because the customer is traveling, then system 520 can determine the closest geographic store or outlet location to forward to the merchant at the time of the sale so the merchant can still perform the appropriate accounting and sales credit needed for the transaction.

When the customer's location, time of request and product selection coincide with an advertising campaign running at that moment in time and at the same geographic location as the customer, then the transaction can be sent to the merchant as verification of its advertising campaign's effectiveness. With this capability, merchants will be able to determine specific geographic responses to advertisements in a near real time fashion.

Another service that may be offered to customers with GPS capable devices (e.g., GPS cellular phones or PDA's) is GPS locator services. For customers accessing system 520 using a GPS capable device, the system may offer a GPS locator service that can be reached conveniently, for example, by two-button access such as by pressing "WT" followed by pressing a single digit such as "3". The customer then receives an operator response such as, "Hello, Mr. Jones. We see that you are located at the corner of Pine Street and Second Avenue in Columbus, Ohio. How may we help you?" The customer may then request any form of assistance offered by a GPS locator service such as directions from the customer's location to a desired destination, the name and location of a hotel or restaurant, etc. In the context of the present invention, the customer has accessed system 520 to order a product (GPS locator services) through a participating merchant (the GPS locator service provider) using a product order number (3). It will be appreciated that the GPS locator service provider may be an independent organization or a part of the system operator's organization.

One important safety related feature that may be made available to customers with GPS capable devices is utilizing system 520 to assure that a customer's location is automatically reported to the local emergency response office when the customer places a 911 emergency call. This feature permits a customer to press "WT" followed by pressing "911" to initiate a 911 emergency call. First, the customer would speak directly to the local emergency response office to communicate the nature of the emergency, followed by system 520 facilitating a GPS locator service's determination of the location of the customer, followed by the GPS locator service communicating the location to the local emergency response office. The above procedure includes a "default" mechanism so that the same automatic intervention of the GPS locator service is provided even if the customer directly dials "911" without first pressing the access button(s) for the "WT" system.

Figure 7:
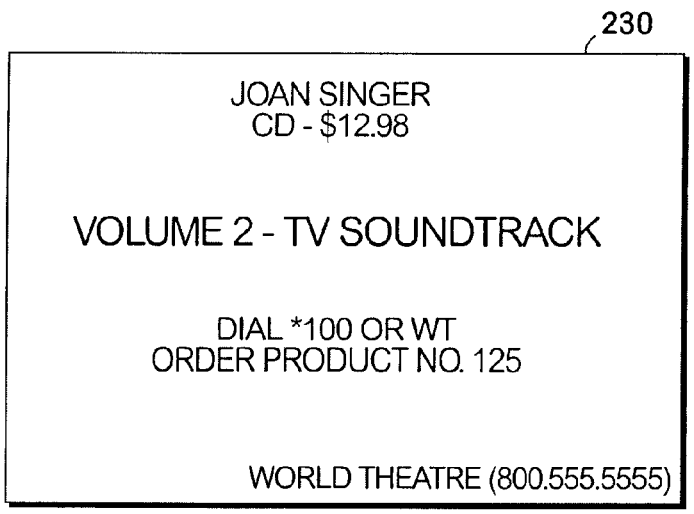
FIG. 7 shows a roadside electronic billboard advertising a product that can be ordered through the automated product ordering system of the invention.

FIG. 7 shows a roadside electronic billboard 230 displaying an advertisement for a CD recording offered through system 20. Because billboard 230 is at roadside, system access preferably is by preprogrammed cellular call or by cellular linking via an appropriate linking number such as "*100". Electronic billboards enable advertisers to advertise at desired times and at desired locations on a network of billboards. Messages may be displayed for durations of say, one minute, and repeated as desired by the advertiser.

Figure 8:
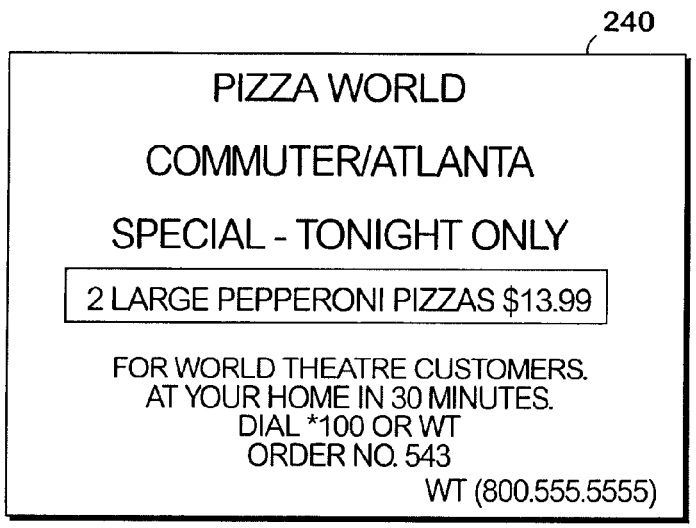
FIG. 8. shows another roadside electronic billboard advertising a pizza special for delivery to a commuter's home to arrive at about the time that the commuter returns home in the evening.

FIG. 8 shows another roadside electronic billboard displaying an advertisement for pizza delivery for commuters on a major roadway. As an alternative to offering only one topping for the advertised pizza, customers may be given the option to select toppings. As another alternative, topping preference may be stored in customer database 70 as product preference information.

Figure 9:
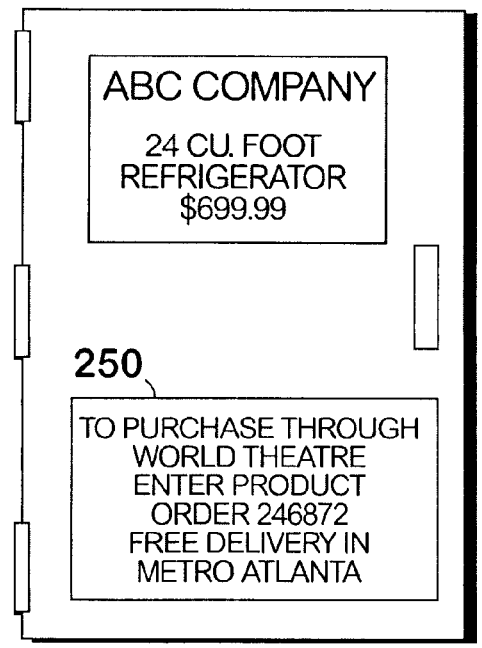
FIG. 9 shows a product display in a retail store where the product can be ordered through the automated product ordering system of the invention.

FIG. 9 illustrates an in-store point of purchase product display 250 for a refrigerator that gives the system customer the option of purchasing the refrigerator through system 20, with free home delivery, without having to endure in-store check out.

Another example of the utility of the system of the invention, not illustrated in the drawings, is where a customer obtains telephone directory assistance services through the system, most conveniently, if desired, by a two-button access such as by pressing "WT" followed by pressing a single digit such as "0". The customer is then directly connected to a directory assistance service provider that may be an independent organization or a part of the system operator's organization. In the context of the present invention, the customer has accessed the system to order a product (directory assistance services) from a participating merchant (the directory assistance service provider) using a product order number (0).

It will be appreciated that automated customer ordering systems of the invention may be provided with a customer interface that permits customers to place an order using means other than POTS or cellular telephone. For example, the following communication methods, coupled with customer identification procedures, may be used, preferably to supplement a telephone access system:

satellite paging
  personnel digital assistant (PDA)
  radio LAN
  satellite cellular.

In this respect, the system operator may provide system customers with small, dedicated devices that permit direct system access and ordering, for example, by simply entering or speaking the order number into the device. These devices may employ satellite paging, PDA or other communications technology.

Figure 10:
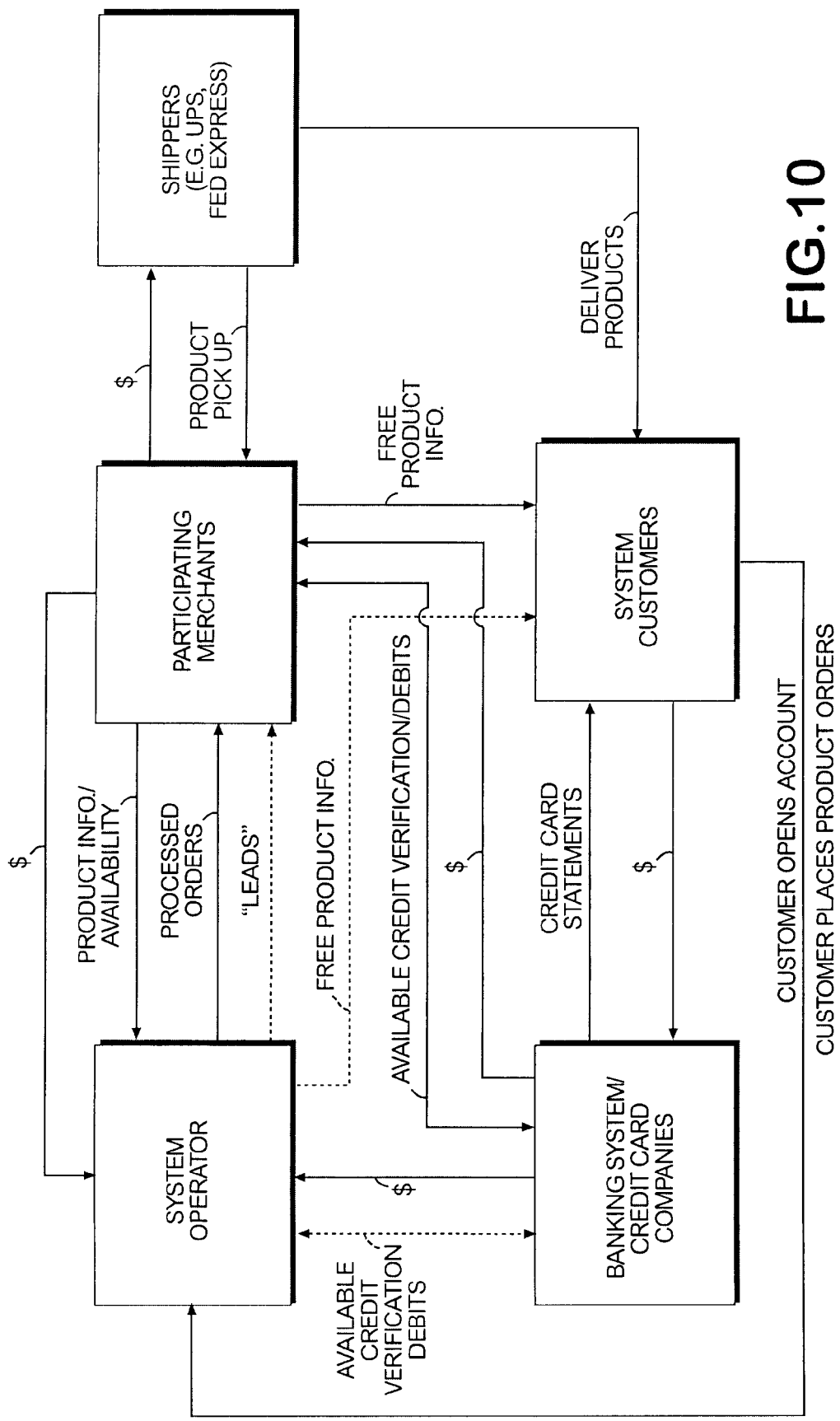
FIG. 10 is a block diagram showing a business model for commercial exploitation of the present invention.

One business model for the commercial exploitation of the automated product ordering system of the invention is shown in block diagram form in FIG. 10. According to this model, the parties most directly involved are the system operator, system customers, participating merchants, shippers and the banking system/credit card companies who interact with each other as shown, all in accordance with interrelationships described above.

Figures 11, 12:
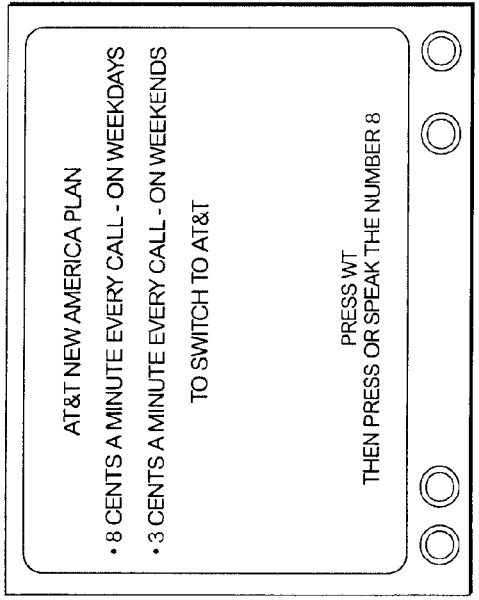
FIG. 11 shows a television advertisement for switching telephone service.
FIG. 12 shows a representative order number hierarchy based on codes having a maximum length of 10 digits.

An example of the significant improvement the system of the invention offers over existing ordering systems is illustrated in FIG. 11 where for a major product or service category such as selecting a long distance carrier, the order number is a single digit. In this example, customers are shown a new discounted rate plan in a television commercial and only have to press the preprogrammed "WT" button or WT speed dial and then one other digit to select a new long distance carrier. In the most powerful embodiment of this example, the customer presses the WT button on his home phone and then simply speaks the number 8 into his phone and his phone service will automatically be switched to AT&T. When used with an embodiment employing voice recognition technology, independent verification of customer identity is not necessary because voiceprint identification provides secure confirmation that the switch to AT&T is authorized. This example illustrates the power of this invention to provide consumers the ability to respond to new pricing and products immediately, with very little effort. This capability is particularly important in large single product or service categories such as the long distance market where hundreds of billions of dollars are spent in the United States every year.

Another example of the invention is its use in connection with trade shows and conventions. Prior to a trade show or convention, prospective attendees may register to attend by utilizing the system of the invention. The trade show or convention is assigned an order number by the ordering system operator, and attendees utilize the system for registration purposes in essentially the same manner as any customer of the system would order a product through the system. At the time of registration through the system of the invention, an existing customer of the system will not have to enter significant additional information. However, a new customer would have to enter sufficient customer identification information for purposes of completing the transaction. At the time of registration, the attendee may be linked to local hotels for making appropriate reservations. Also, the registration information may be utilized to preprint name tags for attendees that may be mailed to the attendees prior to the trade show or convention along with other materials such as exhibitor lists, speaker lists, schedules, etc. For last-minute registration at the trade show/convention site, a kiosk may be set up for registering attendees through the system of the invention, with the kiosk having a printer for printing name tags. In the above-described application of the invention to trade shows and conventions (and other gatherings involving a registration procedure), the attendee (customer) orders a product (trade show or convention registration) through an ordering system of the invention. Additionally, the ordering system may be used in the trade show/convention context to permit attendees to readily and conveniently obtain information and products from the exhibitors. For example, on a trade show floor, an exhibitor's booth may display an order number permitting attendees to obtain information about that exhibitor's business or products. Thus, an attendee standing ten deep or more at an exhibitor's booth may simply note the order number(s) for information and/or products of that particular exhibitor and at that time, utilizing a cell phone or similar device, immediately order the information or products, or the noted product numbers may be used at a later time to actually place the order. The exhibitor order numbers may also be displayed in literature distributed to attendees by the trade show/convention promoter or the exhibitors themselves. Thus, in the context of a trade show, convention or other similar gathering, the present invention may be used to facilitate registration by attendees, as well as serving as an information and product ordering mechanism permitting attendees to obtain information and products from exhibitors.

Other representative applications of the ordering system of the present invention are:

1. Automatic teller machine (ATM) operations. A system customer accesses the system to permit cash withdrawals at an ATM by using the ATM's product order number and entering a PIN.
2. Voter registration. A customer/voter accesses the system using a voter registration order number for the customer's jurisdiction, and the system operator captures the necessary information for delivery to the Board of Elections or other proper government authority.
3. Polling. Pollsters pose questions in appropriate media such as newspapers, television, electronic billboards, etc. with an order number. Customers of the system respond by accessing the system and entering the order number and their answer(s). In tailored applications, e.g. during live broadcast of a football game, the broadcasters may pose a question such as "Was Jones' reception really a touchdown?" with a system order number posted to permit system customers to enter their opinions.
4. Taxi cab hailing. Utilizing a GPS capable device, a customer enters a universal taxi-hailing order number, e.g. "TAXI" (8294), and a taxi is dispatched to the customer's location, with the taxi driver being supplied with not only the location but also the name of the customer.

5. Theme parks. Admission tickets to theme parks such as Walt Disney World are ordered through the system, as well as in-park ordering of souvenirs, restaurant reservations, hotel reservations, and the like. Utilization of a PDA or similar device by the theme park attendee also permits access to real time park information concerning show times and the current waiting time for rides and shows.

6. Ticket ordering. Tickets to events such as concerts and sporting events are ordered through the system along with information about the event(s) for which one obtains tickets, or information about upcoming events.

7. Real time, last minute airline or hotel reservations. Airlines and hotels post last minute available seats/rooms that can be purchased by system customers at deep discounts. Posting may be by Internet (e.g. IMPULSE.COM), electronic billboards, or the like.

8. Bidding. System customers may enter bids to market clearing auction organizations such as eBay through system product order numbers.

9. Home Shopping Network/QVC product ordering. Television shopping channel customers order through the system of the invention using order numbers provided by the channel(s).

10. Stock portfolio information. Current stock quotes of interest are instantly supplied to customers with respect to a portfolio of stocks that may be entered in the system's customer database 70, or in another database associated with an entity that supplies the quotes.

11. Sports profile information. A customer enters his favorite sports categories (e.g. favorite teams, favorite sport, favorite players, etc.) into customer database 70 or the database of another entity, that supplies the individualized sports information to the customer. When the customer accesses the system and enters the order number for sports profile information, he receives current information concerning his selections, preferably through a PDA or similar device.

12. Radio and television stations. Radio stations provide a system order number for listener responses and contest entries. Both radio and television stations may employ system order numbers to permit their listeners and viewers to report traffic alerts and to notify the stations' news desks of breaking news.

13. Charity drives. A charitable fund-raising effort such as "Help Victims of Hurricane Bob" may employ a system order number for cash and in-kind donations, as well as permitting individuals to volunteer for clean-up efforts.

Figure 13:
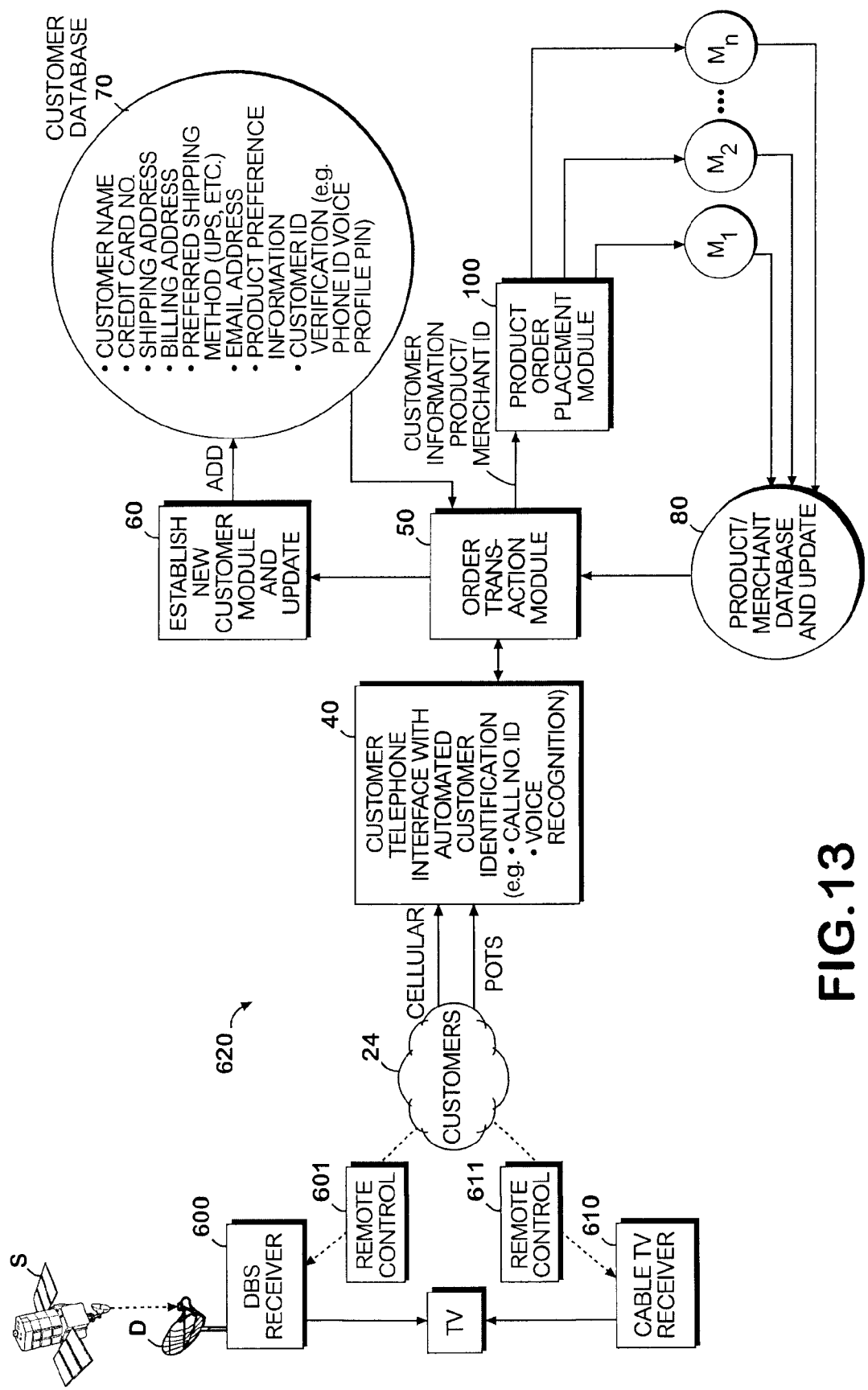
FIG. 13 shows an automated product ordering system wherein products offered by the participating merchants are advertised on direct broadcast satellite (DBS) TV and cable TV.

Implementation of the Invention in Association with Product Advertising and/or Order Placement through Direct Broadcast Satellite or Cable TV Service As discussed above, advertisements and orders for products offered by participating merchants may be facilitated by advertisements in any appropriate medium, such as billboards, magazines, newspapers, etc. In one implementation of the invention, advertisements for the products of the participating merchants are displayed on the TV screens of subscribers to direct broadcast satellite (DBS) or cable TV services. FIG. 13 illustrates a system 620 incorporating product advertising to DBS and cable TV customers. DBS customers receive their direct broadcast signals from satellite S through dish or antenna D to a DBS receiver 600 (commonly referred to as a "set-top box"). Receiver 600 is operated directly by controls on the receiver box or, more typically, by an infrared remote control 601. Cable TV customers receive their broadcast signals by cable (not shown) through a receiver 610 that also may be operated directly or by remote control 611.

Figure 14:
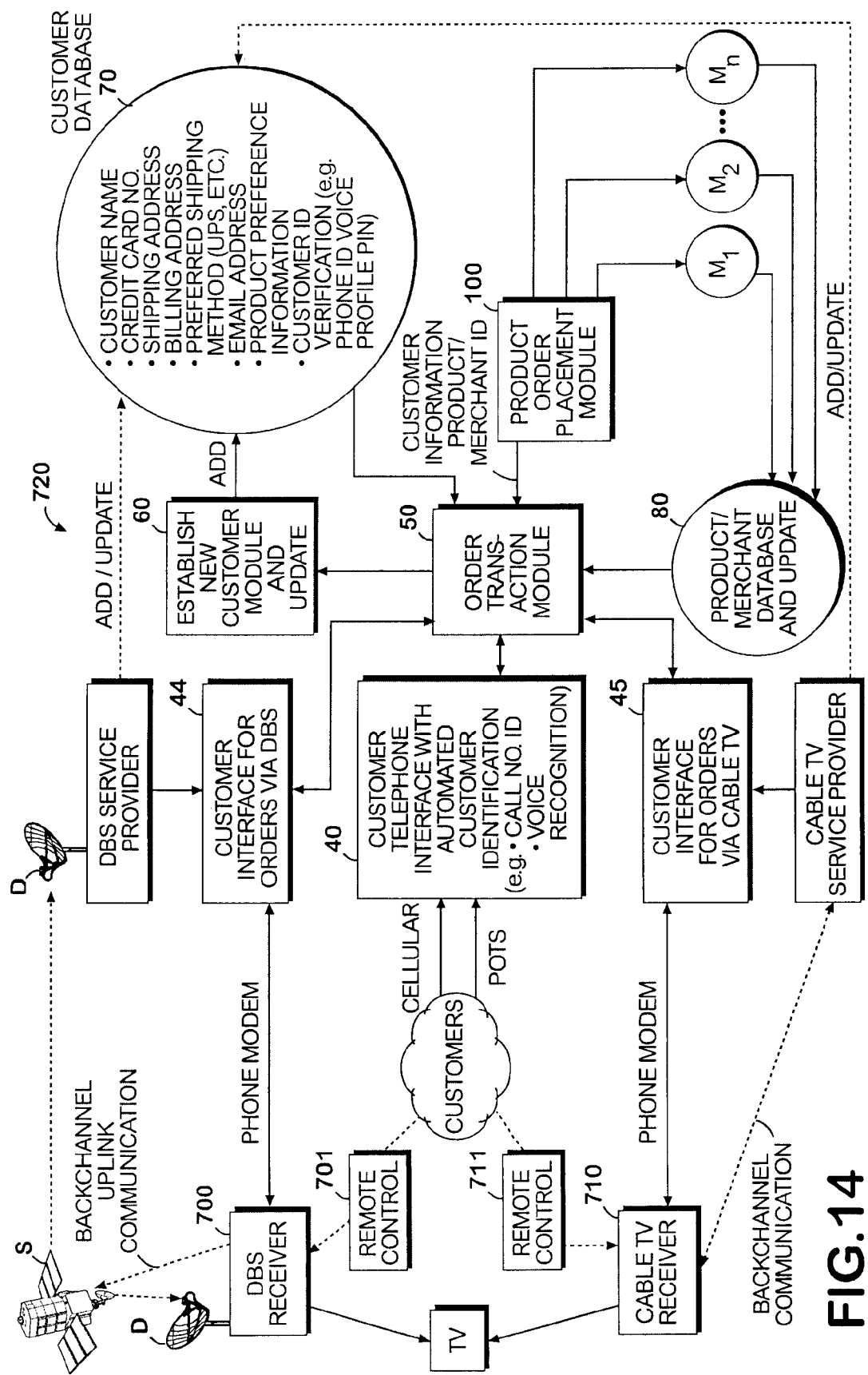
FIG. 14 shows an automated order processing system similar to the system of FIG. 13, but wherein the DBS and cable TV receivers are interactive, thereby permitting viewers/customers to place product orders through their DBS and cable TV remote controls.

FIG. 14 illustrates a system 720 wherein the DBS receiver 700 and cable receiver 710 include the capability of providing an order placement communication from the DBS or cable TV customer to the system operator via a DBS customer interface 44 or a cable TV customer interface 45. This communication may take any suitable form, preferably via a phone modem directly from receiver 700 or 710 to interface 44 or 45. In other embodiments where the DBS receiver 700 is provided with backchannel uplink capability, the communication may be by uplink to the satellite, downlink to the DBS service provider which, in turn, communicates with the system's DBS customer interface 44. Alternatively, in the cable TV embodiment, the backchannel communication may be between the cable TV receiver 710 and the cable TV service provider who, in turn, communicates with cable TV customer interface 45. It will be appreciated that the system operator's relationship with the DBS and cable TV service providers offers the opportunity for the service providers to transfer information from their customer databases to the system operator's customer database 70, thereby facilitating the introduction of new, approved customers into the system.

In preferred embodiments, receivers 700 and 710 are interactive devices permitting users to enjoy the benefits of numerous viewing aids (for example, locating programming in various menus and catalogs and ordering "pay-per-view" programming). Additionally, in accordance with the invention, utilizing the interactive capability and the memory capabilities (17 gigabyte and higher hard drive) of state-of-the-art DBS and cable TV receivers, the receiver 700 and 710 are used to permit customers to enjoy an interactive experience wherein the customer works with a specialized or programmable remote control 701 or 711 to locate and focus in on available products of interest, and order the same through the system of the invention. This TV interactive capability, with the infrastructure of the ordering system of the present invention, is extremely rapid and simple to use. Some examples of uses of the ordering system of the present invention incorporating interactive TV follows, along with information concerning the implementation of these systems:

1. Interactive TV Commercials Across All Broadcast Channels.

Figure 15:
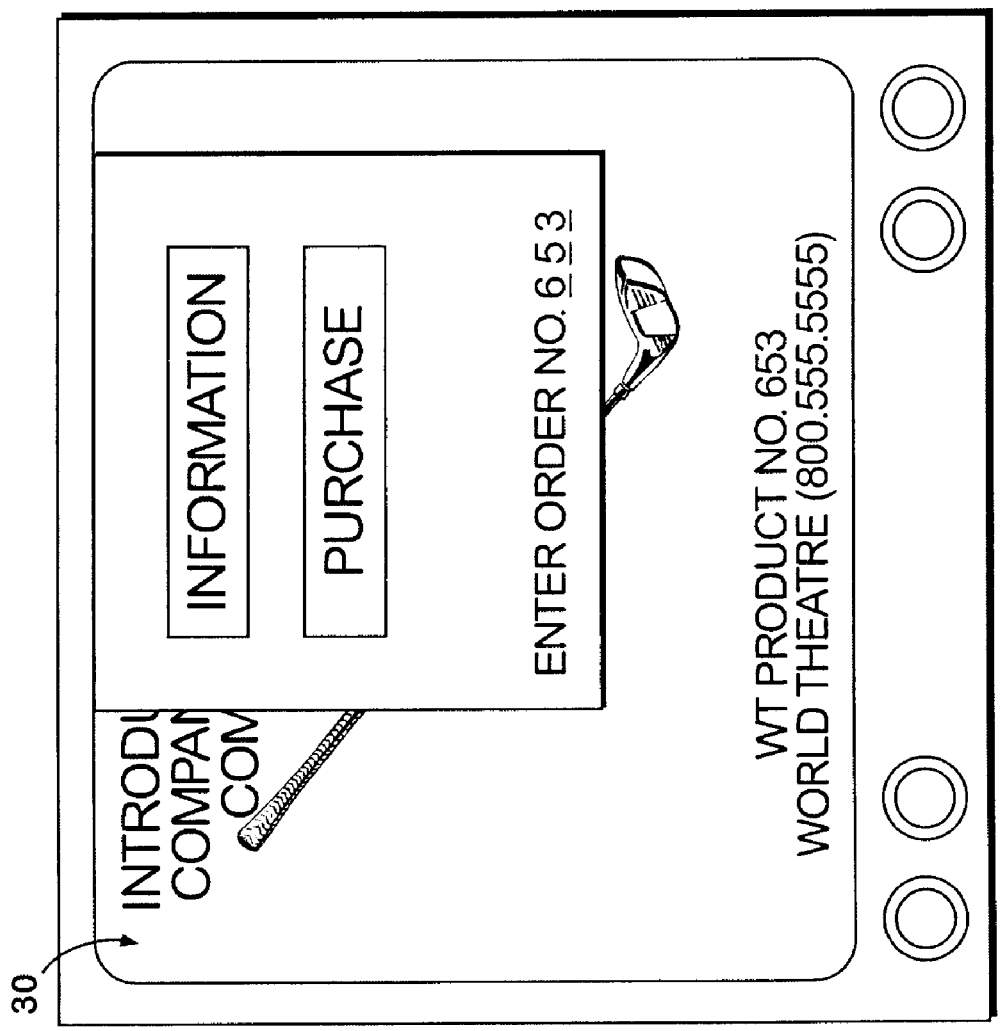
FIG. 15 shows a television advertisement similar to that of FIG. 1A, but showing an overlay screen used by an interactive TV viewer/customer when placing a product order.

The system of the invention, used with interactive TV, creates a merchandising opportunity for every advertisement displayed on all TV channels. According to this implementation of the invention, conventional television advertisements give viewers/customers the ability to see an advertisement for any product, such as a car, phone provider, or event; and immediately request information, initiate a purchase, or navigate several tiers of variations on the item being advertised. For example, when a 20-second ad for a CD player appears, the interested viewer can push one button on the remote control, pausing or "freezing" the ad (while storing all subsequent material on the channel being viewed to the hard drive for delayed viewing after the transaction), and allowing the viewer to request information, see similar models and pricing by the manufacturer, purchase the item, and/or return to the show being held on the hard drive. This function preferably is implemented using a "picture-in-picture" format wherein the customer presses a single button on the remote that opens an overlay screen on the advertisement allowing the customer to use the remote control to input a unique product order number from any advertisement in a preformatted window. An example of this procedure is shown in FIG. 15 which shows the golf club advertisement of FIG. 1A with an overlay screen 88 that facilitates the customer's entry of the order number, followed by the customer scrolling to either "Information" or "Purchase". The above functions are accomplished through relatively small display files (using, for example, a format similar to HTML) of 10 KB to 50 KB that are both the content to be displayed and instructions to the receiver concerning how to display the content and how to respond to the remote control. At a normal VHS compressed bit rate of 2.5 Mb/sec, a 50 KB file requires approximately ⅙ second of a TV channel's full bandwidth or 2% of the bandwidth for ten seconds. This ad file may be placed in a brief bit of black or freeze frame within the ad or sent slowly throughout the ad. By having a standard language (like HTML) for encoding the ad instructions, an advertiser may supply a video ad with the instruction file embedded within to a cable or satellite broadcasting system. Receivers not equipped with the software to recognize, decode and accomplish the instructions would not be affected by the file according to the method of encoding the file. Thus, use of the advertising files allows viewers (customers) the opportunity to pause an interesting ad, investigate the content and then order using the ordering model of the present invention, with the satellite or cable TV receiver using its modem to communicate the order to the system operator. Variations of this interactive TV product ordering system permit customers to access catalog information from a separate video channel or a fast Internet link to the receiver.

2. Dedicated DBS or Cable TV Channel(s).

In addition to providing interactive DBS and cable TV viewers with the ability to purchase products shown in advertisements across all channels, the invention may be utilized in conjunction with dedicated channel(s). An example of such a channel is an "on-demand music channel" that operates 24 hours per day to present a combination of music videos and advertisements. The music channel presents conventional music videos on one portion of the screen, along with other music/entertainment related programming, while also presenting banner advertisements and other forms of advertisements on other portions of the screen. An interactive guide permits viewers to select those genres of music that are of most interest to them for music video display, as well as permitting viewers to navigate catalogs of available music. A thorough discussion of the marketing concepts, hardware and other features associated with an on-demand music channel is set forth in commonly assigned co-pending application Ser. No. 09/502,069, filed Feb. 10, 2000, entitled "Music Delivery System", the contents of which are incorporated herein by reference in their entirety.

3. Information Bounce-back from the System's Central Computer to a Satellite or Cable TV Receiver, in General.

There are numerous marketing or customer information systems that require the use of a central database to supply a small, but key, set of information to a customer. For example, a customer viewing an ad for a pickup truck may like to know the location of a nearby dealer, or even have the dealer phone the customer. Or perhaps, a pizza franchise ad has just appeared and a customer would like to order one if he thought there was free delivery to his home. Or a customer hears an ad for a concert and wonders whether he can still purchase a good seat. Additionally, a customer may wish to use his TV remote to request the amount of his electric bill and then pay it. All these functions require that the customer request a small amount of information from a large database that may need to know the customer's identity. The interactive TV implementation of the present invention is well adapted to allowing an individual to simply request information, see the results in the thirty seconds or so required for a satellite or cable TV receiver to establish a modem connection (via a conventional phone or Internet) with a secure central computing system that knows the identity and billing details (like the credit card number) of the satellite or cable TV receiver and to initiate the transaction provided confirmation is received from the customer by his handheld remote. As suggested above, other modes of providing information from a central computer system include the Internet or downloads from a satellite.

4. Rating System.

In a rating system similar to the well-known Nielsen rating system for shows and movies, interactive TV viewers have the opportunity to post approval ratings of what they just watched, for possible compensation. This information feeds a particular product order number or code with the ability to rate the content on a scale of, perhaps, one to five stars to create immediate feedback to the affiliates.

5. Auctions.

The ability of the viewer/customer to interact with the TV simplifies the posting of a bidding system, again tied to a particular order number or code per item, working with the customer's remote control or other input device. Items up for bid become virtually unlimited, i.e., goods, services, or possibly high profile items within established auction networks, such as eBay, ubid, etc. This system is very effective for time dependent, last minute bargains and overstocks. The viewer has the ability to participate in what becomes a silent auction, entering pricing information through the remote control or input device as described above.

6. Home Schooling.

Utilizing the TV remote control, and requesting particular classes or complete curriculums with product order numbers or codes, the interactive TV viewer may participate in a distant learning experience. This interaction offers the student access to the world's greatest professors within every discipline, giving the student the ability to ask questions, and even take tests from the comfort of his home. Transcripts may be made available to eliminate the need to take excessive notes, and downloaded via email to the student's home PC or, perhaps, printer enabled set-top box. Courses may be based upon enrichment classes, advanced degrees, or even complete grade level curriculums for home schooling. This system also lends itself toward national standardized testing on all subject materials.

7. Reservations and Ticketing.

Hotel, airline or restaurant reservations may be made targeting specific venues as defined by the product ordering system. Any of these may be reserved using a customer's interactive TV remote. Advanced ticket bookings or last minute availability may be advertised for sporting events, concerts, transportation and travel, cruises, etc. Things such as seating plans and views from particular sections may be included to simplify seat selection.

8. Insurance Quotes.

Personalized rates and quotes may be obtained by direct input of a particular product order number. This application is applicable to insurance for medical, dental, auto, homeowners, etc. Simply by answering a few questions, direct quotes are sent via email, fax, or to a printer-enabled set-top box.

9. Pharmaceutical Information.

Order numbers or codes may be applied to new or existing pharmaceutical products to make available information and detail not normally available in standard commercials. Additionally, the interactive TV implementation of the invention may serve as a communication vehicle to track/validate clinical trials for accuracy and compliance to FDA standards. This would include dosage, timing, and possible side effects entered by clinical trial participants through a secure order number transaction that would generate a reporting document back to the pharmaceutical company or clinical trial agency. The pharmaceutical company then uses this information to evaluate the clinical trial or to transfer important drug-related information in a secure manner to doctors/providers to keep them informed of new and existing medicines.

10. Public Opinion Polling.

The interactive TV implementation of the invention facilitates two-way communication to assess public opinion on any topic worth considering. Direct feedback provides significant value to news agencies, political operatives, police investigations, or even interactive game shows, e.g., the fourth lifeline in "Who Wants to Be a Millionaire?".

11. Take-out Menus.

Local restaurants offer mouth-watering cuisine in TV ads with an embedded product order number for immediate home delivery. This application encompasses all standard pizza and Chinese, along with possible gourmet dining for the "no-time" lifestyles of today.

12. Coupons.

Merchants of everyday products utilize this service to offer coupons for goods and services, which are emailed to the consumer or sent directly to a printer-enabled, set-top box. This application drives traffic to the stores under specific promotions the merchants choose to offer.

13. Video Messaging and Conferencing.

Using specified order numbers or codes, interactive television viewers may retrieve personalized video messages or emails sent to them by individuals or corporations. These messages may include family greetings sent into the system operator via its web site, or personalized corporate ads and messages for a particular household. The messages may include corporate policy and training programs, along with possible recruitment applications. This system may also be used to facilitate video conferencing for the growing "work-at-home" segment of the business community. The corporation may lease side band capacity from the satellite or cable company, which would only be accessible through proper identification built into the ordering system. Preferably, VHS format is used to conserve bandwidth for this transmission.

Dedicated Product Ordering Devices

Figure 16:
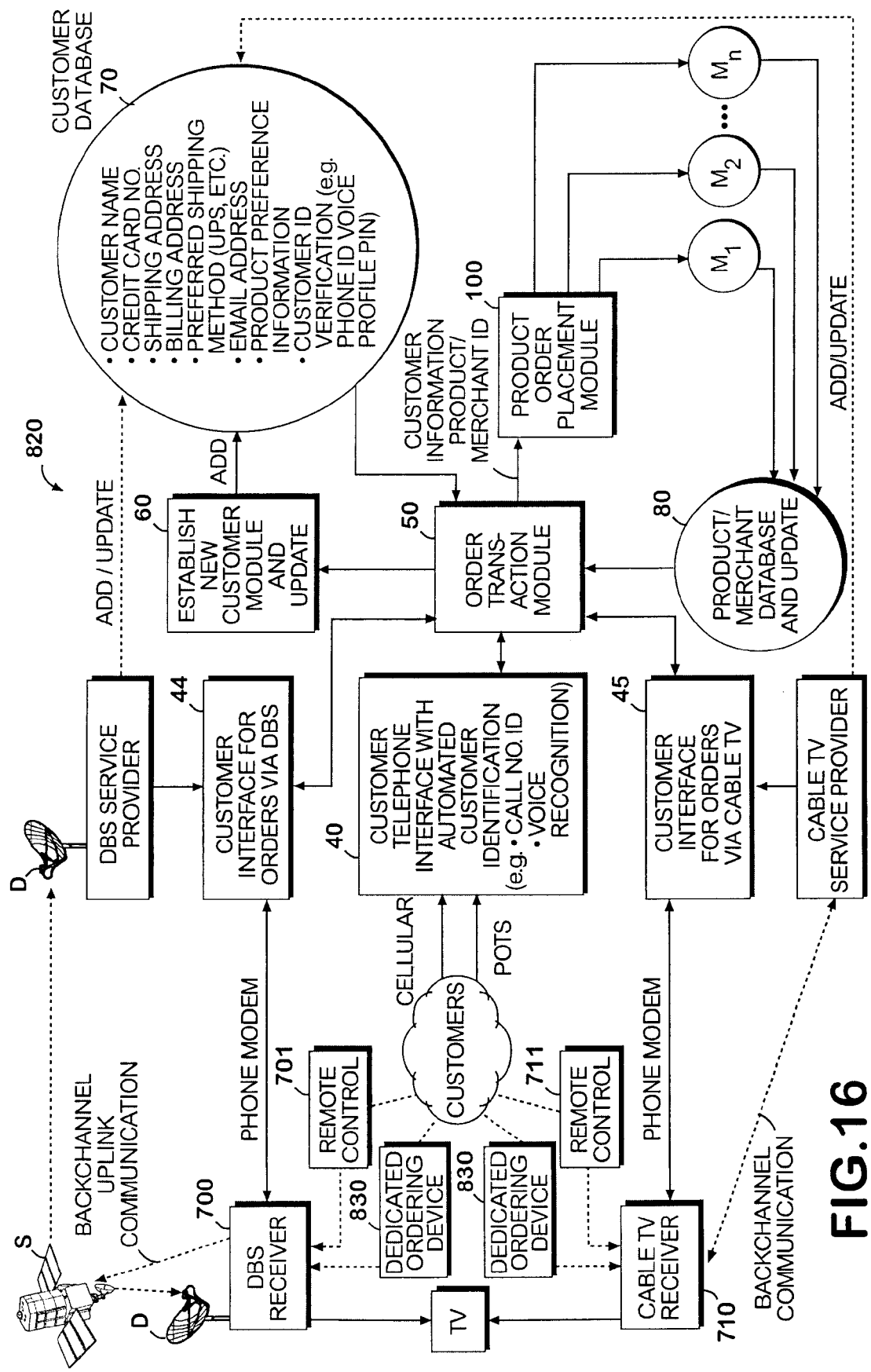
FIG. 16 shows an automated order processing system similar to that of FIG. 14 wherein customers may utilize dedicated ordering devices to order products at other people's homes and in public places such as airports, train stations, restaurants and bars.

FIG. 16 is a schematic representation of another system 820, similar to system 720 of FIG. 14, with the additional capability afforded by dedicated ordering devices 830 that permit system customers to access the system through any system-connected interactive DBS receiver or interactive cable TV receiver, including those at other people's homes and those in public places, such as airports, train stations, restaurants and bars. Each dedicated ordering device 830 takes the form of a small handheld transmitter that has a convenient shape and appearance suitable for being easily carried in a purse, on a key chain, in a pocket or otherwise conveniently kept on one's person. Device 830 may take the form of a small flashlight-like or pen-like device 840 (FIG. 17), an electronic car key-like device 850 (FIG. 18), an attachment to a wristwatch (not shown), or other suitable physical configuration. The dedicated ordering device, in whatever form, preferably includes a microprocessor that generates a customer identification code, for example, a fifteen digit code or the customer's ten digit phone number, when a button on the device is pressed. This code is then flashed by an IR light emitting diode (LED) to the interactive TV receiver (or, alternatively, transmitted by RF link, ultrasound or other suitable means). Within the ordering system of the invention, the identification code is related to a specific person or a specific account. Each customer may have more than one identification code, allowing purchases to be billed to different accounts, or for limits to be set on the size and frequency of purchases. Different family members may have their own identification codes. As mentioned above, the dedicated ordering devices may be used at sites outside the customer's household, including commercial sites like an airport, train station, restaurant or bar. For example, a dedicated ordering device may be used to order pizza from a neighbor's interactive TV receiver. As another example, groups of persons may gather for "purchasing parties" at a person's house, with discounts offered by the system operator and/or participating merchants if ten or more users place orders. Purchases initiated at another's home or a commercial site are billed and shipped to the individual associated with the identification code that is communicated to the system by the dedicated device.

In another embodiment, the dedicated ordering device 860 may be integrated with a cellular phone (FIG. 19) or a PDA (not shown). In these embodiments, the cellular phone or PDA provides hardware, such as microprocessor, battery source and phone identification code to reduce the size and cost of the add-on product ordering device. These embodiments are particularly well suited to customers who usually carry a cellular phone or PDA. In addition to all the functions described above in connection with the embodiments of FIGS. 17 and 18, the integration of the ordering device with a cellular phone permits downloading to the phone of identification codes, voice verification of the customer and, in certain embodiments, a voice or keyboard interface to an interactive TV system by using the cellular phone's internal microphone and keyboard. Furthermore, with the cellular phone and interactive TV system being linked by the dedicated ordering device, there are separate communication paths to the central computer system of the system operator to permit a more secure and easy-to-use purchasing system. In this regard, anytime a purchase is made utilizing the embodiment of FIG. 19, an order confirmation may be sent from the central computer system back to the cellular phone as an added security measure. Also, if the cellular phone has an "address book" feature, address information may be tied into any purchase request. For example, a customer may wish for a product ordered through the system to be sent to his mother, whose address is in the phone's address book. In this situation, the customer, when placing the order, may send his mother's address directly to the central computer of the system operator by the IR transmitter, or, in the alternative, the address may be sent electronically using a wireless application product (WAP) interface to the computer. Similar advantages to those discussed above in connection with cellular phones are available in those cases where the dedicated ordering devices are integrated with PDA's or other communications equipment.

The manner and means for designing and producing dedicated ordering devices as described above are well within the skills of those familiar with remote control units for consumer electronics and similar electronic devices, and will not be discussed in detail herein. Suffice it to say that relatively unadorned, dedicated order devices 830, in various forms, may be produced in quantity for a cost on the order of one dollar (U.S.) or less and provided to all customers of system 820. It will be appreciated that existing system customers may receive their dedicated ordering devices with their pre-programmed customer identification number that will identify them to system 820. Additionally, and of considerable value in recruiting new customers to system 820, fully operational dedicated ordering devices may be distributed free of charge to literally millions of people who are not customers of the system with instructions on how to supply information to the system to register as an approved customer. If such a non-customer attempts to use the device before registering as a customer, the interactive receiver will prompt him of the need to register before making a purchase.

Figure 20:
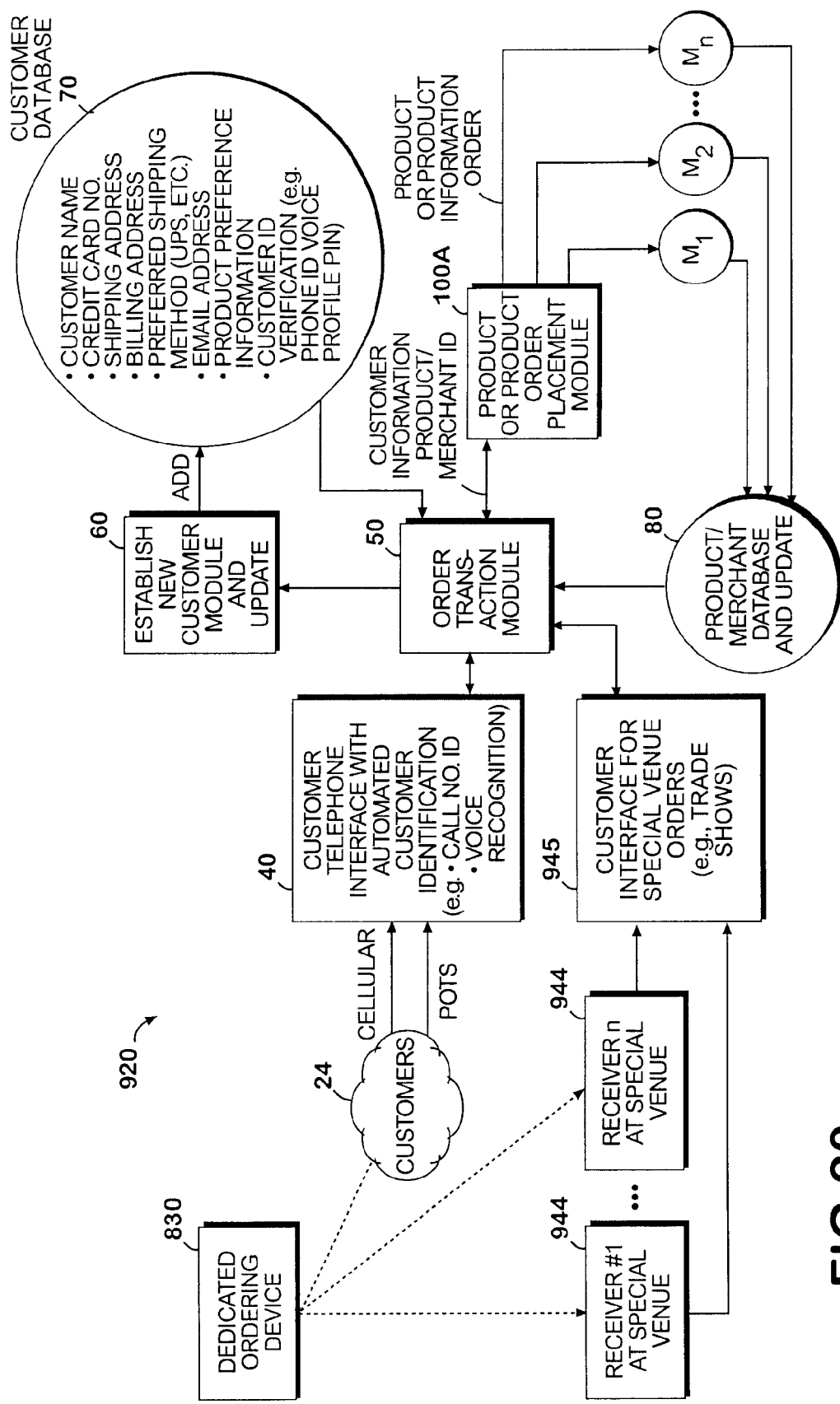
FIG. 20 shows an automated ordering system of the invention permitting ordering of products or product information at special venues such as trade shows using a dedicated ordering device.

The low cost and versatility of these dedicated ordering devices render them useful for product or product information ordering at many special venues. For example, as shown in FIG. 20, dedicated ordering devices 830 may be distributed to attendees of trade shows and conventions as they arrive at the show site. In certain embodiments, the registrar simply points the device at an IR receiver so that the system can associate the name and address of the attendee with the pre-programmed identification code associated with that device. In the trade show hall, attendees may order literature or products at specific booths merely by pointing their dedicated ordering devices at a booth receiver 944. The booth receiver may have a direct communication link through customer interface 945 to the central computer of the system operator to communicate orders for processing according to the invention.

In another embodiment shown in FIG. 21, the dedicated ordering device 870 includes not only an IR (or RF or ultrasound) transmitter for the functions described above, but also a bar code reader and memory capability. The bar code reader allows a person to enter a store, for example a building supply store, and use the reader end of the device to scan bar codes of items he wishes to purchase, for example, a sheet of plywood, a can of paint and a hammer. Several reading stations may be located throughout the store to receive and process orders. Each reading station may take the form of a computer station with monitor screen and, optionally, a printer. When the customer aims his dedicated ordering device at the read station, the device transmits its identification number, followed by the items the customer wishes to purchase. The monitor displays a list of the ordered items, conducts the transaction with the account associated with the identification number through the system of the invention, and requests that the ordered items be sent to a pick-up point or delivered to the customer's home. Customers do not necessarily have to walk among items in the store to scan bar codes, but, alternatively, may page through a catalog with bar codes located next to each item to create their order list. The embodiment of FIG. 21 also has the capability to provide higher account security by requiring a user to scan a bar code located in their wallet or purse to complete a transaction. The necessity of scanning such a bar code ensures that a lost dedicated ordering device cannot be used for purchases by one who finds it. This feature operates by the dedicated ordering device transmitting its pre-programmed internal ID number, followed by the bar code scan to the interactive TV receiver or read station. The bar code scan feature may be implemented in numerous ways to balance convenience with security. For example, small purchases, perhaps less than ten dollars, may not require the bar code digits, or a dedicated ordering device might remember a bar code for some period of time, for example one hour, after each scan.

It will be appreciated, as mentioned above, that use of the dedicated ordering devices may be accompanied by optional security measures to assure that the person placing the order is the authorized customer for that device. For example, the dedicated ordering device may include several buttons, for example four buttons, that must be pressed in a predetermined sequence to define a PIN for the particular customer in order to complete an ordering transaction. As another alternative, the device may include a thumb print identification unit that must be activated to confirm the user's identity at the time of each purchase transaction. Additionally, when used in conjunction with a cellular telephone, an authorized purchase transaction may require voice identification and/or voice recognition in order to authorize the transaction.

It will be appreciated that the ordering system of the present invention may be used in conjunction with a web site offered by the system operator. One use of the web site is for a system customer who may have seen an advertisement for a specific product offered by a participating merchant, but the customer did not note the order number. By accessing the web site, the customer may locate the product (using the participating merchant's name or product identification) and obtain the order number. In other instances, utilizing the product order number infrastructure of the invention, a customer may wish to place his order through the web site. To this end, the web site may display an image of the product, the product order number and a means for the customer to either order the product or order product information. As one option, ordering may be achieved by the customer simply clicking on the image, with the order number being "embedded" in the image. The web site may also provide a link to the web site of the appropriate participating merchant.

Another optional feature of the invention permits "data mining" with respect to individual authorized customers within a family having a single account with the system operator. According to this feature, each authorized family member is assigned a second level, two digit PIN that is entered at the time of completing a transaction.

It will be appreciated that the system operator may offer revolving credit to customers of the system, thus providing the system operator an additional profit stream and an additional mechanism for providing "clean" orders which do not expose participating merchants to credit risks, an option that is particularly appealing to small, niche vendors who may wish to utilize the system as their sole or primary order placement vehicle.

It will also be appreciated that the present invention has been described in connection with an automated order processing system for products. In this regard, the term "products", as used in the specification and claims, is deemed to include both goods and services offered by participating merchants to customers of the system. Additionally, the invention may be used to process other kinds of transactions such as a situation where a non-profit organization advertises for donations and provides donors the opportunity to make monetary contributions through the system, or where an organization permits a customer or client to pay an invoice (with associated order number) through the system. Such donation transactions and invoice payment transactions and other transactions where one party (the "merchant") permits another party (the "customer") to pay through the system are deemed to involve "products" as that term is used herein.

With the large number of product/merchant combinations for products made available through the system, most of the product order numbers will be in the range of 6 to 10 numbers. However, for certain, very high usage situations, or products particularly appropriate to a specific customer base, truncated product order numbers, even single digit numbers as discussed in connection with FIG. 11, may be utilized to facilitate transactions. One example of a number hierarchy based on 10-digit codes is provided in FIG. 12, below. In this example, the ten single digit codes (0 through 9) are reserved for use in very large single product categories such as the example for selling long distance telephone service illustrated in FIG. 11.

Referring to FIG. 12, the number of merchants is set forth in the first column with the number of digits used to define each merchant in the second column. The corresponding third column shows the maximum number of product order number combinations available to each merchant in a ten digit code that includes the digits used to define each company or merchant. In this example, merchants may assign shorter or truncated product codes for higher volume products, thereby creating total code lengths that would typically vary from 3 to 10 digits. Maximum number of product combinations are assigned to companies based on size and product offerings. For example, the very largest global companies that offer many products, components and services would be assigned very large maximum product code combinations. The hierarchy of code assignments would thereby allow system 20 to process both retail and business-to-business sales. The larger company codes having from 8 through 10 digits would be utilized primarily by professionals that offer fewer or, in many cases, even a single product or service. One powerful example is attorneys, accountants and consultants utilizing a single code for any service they offer, allowing their customers to simply dial one code provided on each invoice to automatically pay their bills. The number hierarchy shown in FIG. 12 is one example of how the distribution or assignment of numbers can be made. Other hierarchy or distributions may be utilized. For example, number hierarchies having maximum code lengths of eight, nine, eleven, twelve, thirteen or fourteen digits may utilize the structure of FIG. 12 for hierarchal relationships between number of companies ("merchants"), company digits, product digits available and maximum product combinations per company.

The system and method of the invention may have application at any scale of operations (as measured by number of participating merchants, volume of orders, dollar volume, etc.) that is economically viable; however, it will be appreciated that the invention has as one primary utility the provision of a universal automated product ordering system that is known to virtually all consumers in the modern economy and permits consumers to first join the system and thereafter purchase any offered product any time through a simple, fully understandable, non-intimidating access and ordering procedure that may be as easy as pushing one button (followed by entry of an order number) on a POTS telephone, cellular telephone, PDA, pager or a dedicated device.

While the present invention has been described in connection with certain illustrated embodiments, it will be appreciated that modifications may be made without departing from the true spirit and scope of the invention.

What is claimed is:

1. A computer system for automated order processing permitting a plurality of customers who have already provided a customer information set to the system to order one or more products from a plurality of products offered by one of a plurality of participating merchants, said system comprising:

a first database including a variable length order number assigned to each of the plurality of products, each order number identifying a unique one of said plurality of products and the one of said plurality of participating merchants offering the product;

a customer database including the customer information set corresponding to each of the plurality of system customers, said information set including a customer identification, a customer address, and a method of payment;

means for receiving an incoming product order number representing one of the plurality of products offered from one of the plurality of customers;

means for matching the incoming product order number to the one of the customer information sets corresponding to the one of the plurality of customers;

means for matching the incoming product order to the one of said plurality of participating merchants that offers the one of the plurality of products;

means for communicating the receipt of the product order number to the one of said plurality of participating merchants; and security means for confirming the identity of the one of the plurality of customers placing the order.

2. The system of claim 1 wherein the customer information sets comprise a customer credit card number.

3. The system of claim 2 wherein the customer identification sets comprise a customer identification verification information selected from a group consisting of a phone ID, a voice profile, a personal identification number, a credit card number, a social security number, and a date of birth.

4. The system of claim 3 wherein the customer identification sets comprise a product preference information.

5. The system of claim 1 wherein the means for receiving comprises a telephone interface including an automated customer identification means selected from a group consisting of a call number identification means and a voice recognition means.

6. The system of claim 1 wherein the means for communicating comprises a telephone connection between the system and the one of said plurality of participating merchants.

7. The system of claim 1 wherein at least one of the variable length order numbers is assigned to a product information package; and wherein the system further comprises a product information database comprising the product information package.

8. The system of claim 1 further comprising an inventory control computer of the participating merchant; and
a communication link between the system and the inventory control computer.

9. The system of claim 1 further comprising a shipper database and means for determining a shipment option for a delivery of the one of the plurality of products.

10. The system of claim 1 further comprising means for permitting the system to verify an available credit and for routing a "clean" processed order to the one of said plurality of participating merchants offering the one of the plurality of products.

11. The system of claim 1 wherein the means for communicating the customer information and the receipt of said order originates from one of a direct broadcast satellite and a cable TV receiver.

12. The system of claim 1, wherein the means for receiving comprises a website.

13. The system of claim 12 wherein the website comprises a website displaying an image of one of the plurality of products and the product order number representing the one of the plurality of products.

14. The system of claim 13, wherein the website further comprises a website enabled to receive an indication that the one of the plurality of customers has selected the one of the plurality of products by clicking on the displayed image, and wherein the order number representing said product is embedded in said displayed image.

15. The system of claim 13, wherein said website further comprises a link to a website of the one of the plurality of participating merchants offering said product.

16. The system of claim 1, further comprising data-mining means for mining a customer data set associated with the one of the plurality of customers.

17. The system of claim 16, wherein said data mining means mines data associated with the customer, and wherein the customer has been authorized and has been assigned a personal identification number (PIN).

18. The system of claim 1, implemented in a trade show, and wherein one of the plurality of products offered is selected from a group consisting of: a registration for a trade show, a registration for an accommodation, and an information about one of the one or more products.

19. The system of claim 1, implemented in a network providing an automatic teller machine (ATM) service, said system further comprising an interface permitting cash withdrawals, and the means for receiving comprises a means from receiving an order number representing the automatic teller machine service and a personal identification number (PIN).

20. The system of claim 1, implemented in a voting system, wherein the variable length order number is assigned to a voter choice for a jurisdiction, wherein the system further comprises a delivery means for delivering the voter choice to a proper authority.

21. The system of claim 1, implemented in a polling system for querying customers, wherein the variable length order number is assigned to an answer.

22. The system of claim 1, implemented in a system utilizing a GPS capable device for locating vehicles, wherein the variable length order number is assigned to a vehicle to be dispatched to a location of the customer.

23. The system of claim 1, further comprising an advertising media displaying one or more product order numbers, wherein the advertising media is selected from a group consisting of: an Internet-based electronic catalog and a print catalog.

24. The system of claim 1, wherein the means for receiving receives a customer selection of a product delivery time.

25. The system of claim 1, wherein the first database enables one or more merchants to update the status of the plurality of products selected from a group consisting of: on back order, unavailable, and in stock.

26. The system of claim 1, wherein the means for receiving further a location information of the one of the plurality of customers from a GPS integrated device.

27. The system of claim 26, wherein the first database further comprises a product order number assigned to travel information.

28. The system of claim 1, further comprising:
first receiving means at a location of one of the plurality of customers for receiving a product advertisement from a broadcasting transmission system;
display device displaying the product advertisement, and wherein the means for receiving receives the product order number assigned to a product advertised in the product advertisement; and
interface means for forwarding said received product order to the one of the plurality of participating merchants.

29. The system of claim 28, wherein said first receiving means comprises e-mail.

30. The system of claim 28, wherein said first receiving means comprises a phone modem connection.

31. The system of claim 28, wherein said broadcasting transmission system further comprises a direct broadcast satellite transmission system and said first receiving means comprises a direct broadcast satellite receiver, and wherein said automated order processing system further comprises:
a backchannel uplink for communicating the received one or more product order numbers and the customer identification of said customer to a satellite;
a downlink to a direct broadcast satellite service provider receiving said product order numbers and the customer identification from said satellite, and communicating, in response to said receiving, said product order numbers and the identification to an interface means.

32. The system of claim 28, wherein said broadcasting transmission system includes a cable TV transmission system and said first receiving means includes a cable TV receiver, and wherein said order processing system further comprises:
a backchannel uplink capability for communicating the received one or more product order numbers and the customer identification to said cable TV receiver;
a downlink to a cable TV service provider for receiving said product order numbers and the customer identification from said cable TV receiver, and communicating, in response to said receiving said product order numbers and the identification to an interface means.

33. The system of claim 28, further comprising an interactive means enabling said customer, in response to the received broadcast advertisement, wherein said enabling is selected from a group consisting of: enabling the customer to immediately request additional information about the advertised product, enabling the customer to initiate a purchase, and enabling the customer to navigate several variations of the advertised product.

34. The system of claim 33, wherein said interactive means is capable of pausing the broadcast advertisement while storing an additional transmitted material on a channel being viewed.

35. The system of claim 33, wherein said interactive means comprises:
push button input control device for initiating an opening of an overlay screen on said display device; and
wherein the means for receiving one or more product order numbers comprises an input receiving from the control device the product order numbers representing a product selected from the group consisting of: an information set describing the advertised product and the advertised product.

36. The system of claim 33, further comprising means presenting catalog information to said customers from one of a separate dedicated video channel and a fast Internet link to the receiving means.

37. The system of claim 34, wherein said first receiving means comprises a communication interface with the first database, a receiver receiving a customer generated confirmation.

38. The system of claim 1, wherein the first database comprises a variable length order number assigned to an information set describing a location where one or more of the plurality of products may be purchased.

39. The system of claim 1, implemented in a ratings system, wherein the first database further comprises a variable length order number assigned to a rating.

40. The system of claim 1, implemented in an auction system, wherein the variable length order number is assigned to a bid for one of the plurality of products.

41. The system of claim 1, implemented in a learning curriculum, wherein the variable length order number is assigned to an education courses.

42. The system of claim 1, implemented in a tourist booking system, wherein the variable length order number is assigned to one selected from a group consisting of a hotel reservation, an airline reservation, and a restaurant reservation.

43. The system of claim 1, implemented in a system for providing for insurance quotations, wherein the variable length order number is assigned to a personalized price quote.

44. The system of claim 1, implemented in a system for providing pharmaceutical information, wherein the variable length order number is assigned to one of a pharmaceutical product, and information about said pharmaceutical product.

45. The system of claim 44, wherein the variable length order number is assigned to information about clinical trials for FDA compliance.

46. The system of claim 45, wherein the variable length order number is assigned to a secure transfer of a drug-related information to a health-care provider.

47. The system of claim 1, wherein the variable length order number is assigned to a request for a coupon for a product.

48. The system of claim 1, implemented for providing customers with a video messaging and conferencing service, wherein the variable length order number is assigned to a retrieval of a personalized video message or e-mail.

49. A computer system for automated order processing permitting customers who have already provided customer information to the system to order selected products from an array of products offered by a plurality of participating merchants, said system comprising:

a first database including a variable length order number assigned to each product offered through the system, each order number identifying a unique product and a merchant offering the product;

a customer database including a plurality of customer information sets comprising information for identifying the customer;

a first input terminal, comprising an address, for receiving an indication of a product order from a customer who has connected to the system via the address;

a first module for matching information associated with the customer connected to the system to a corresponding customer information set;

a second module for matching the indicated product order number to the merchant offering the product identified by the indicated product number;

a first output terminal for communicating the received indication and at least a portion of the corresponding customer information set to the merchant offering the product; and a security module for confirming the identity of the connected customer.

* * * * *